(12) United States Patent
Kawano et al.

(10) Patent No.: US 8,740,682 B2
(45) Date of Patent: Jun. 3, 2014

(54) GAME MACHINE, PROGRAM FOR REALIZING GAME MACHINE, AND METHOD OF DISPLAYING OBJECTS IN GAME

(71) Applicant: Capcom Co., Ltd., Osaka (JP)

(72) Inventors: Takahiro Kawano, Osaka (JP); Hidenori Kouyama, Osaka (JP); Kenta Yamaki, Osaka (JP)

(73) Assignee: Capcom Co., Ltd., Osaka (JP)

( * ) Notice: Subject to any disclaimer, the term of this patent is extended or adjusted under 35 U.S.C. 154(b) by 0 days.

(21) Appl. No.: 13/730,410

(22) Filed: Dec. 28, 2012

(65) Prior Publication Data

US 2013/0116019 A1 May 9, 2013

Related U.S. Application Data

(63) Continuation of application No. 12/726,912, filed on Mar. 18, 2010, now abandoned.

(30) Foreign Application Priority Data

Apr. 20, 2009 (JP) ................................. 2009-102368

(51) Int. Cl.
*A63F 9/24* (2006.01)

(52) U.S. Cl.
USPC ............................................................ 463/2

(58) Field of Classification Search
CPC combination set(s) only.
See application file for complete search history.

(56) References Cited

U.S. PATENT DOCUMENTS

| | | | |
|---|---|---|---|
| 5,853,324 A | 12/1998 | Kami et al. | |
| 7,281,981 B2 | 10/2007 | Yotoriyama | |
| 2002/0022518 A1 | 2/2002 | Okuda et al. | |
| 2003/0040362 A1 | 2/2003 | Egashira | |
| 2003/0063115 A1 | 4/2003 | Kaku et al. | |
| 2004/0063501 A1* | 4/2004 | Shimokawa et al. | 463/49 |
| 2004/0259615 A1* | 12/2004 | Mori et al. | 463/3 |
| 2008/0180438 A1 | 7/2008 | Sasaki et al. | |
| 2008/0194325 A1* | 8/2008 | Komuta | 463/31 |
| 2009/0082076 A1 | 3/2009 | Annunziata | |

FOREIGN PATENT DOCUMENTS

| | | |
|---|---|---|
| EP | 2 000 185 | 12/2008 |
| JP | 9-81780 | 3/1997 |
| JP | 11-70274 | 3/1999 |
| JP | 2000-37560 | 2/2000 |
| JP | 2002-85828 | 3/2002 |
| JP | 2003-44219 | 2/2003 |
| JP | 2003-67779 | 3/2003 |
| JP | 2005-137921 | 6/2005 |
| JP | 2008-186323 | 8/2008 |

* cited by examiner

*Primary Examiner* — Melba Bumgarner
*Assistant Examiner* — George Howarah
(74) *Attorney, Agent, or Firm* — Hamre, Schumann, Mueller & Larson, P.C.

(57) ABSTRACT

A game machine is provided that displays an attack direction in a 3D virtual game space when a player character is attacked, such that the human player can readily recognize the attack direction. In the game machine that activates the player character and an enemy character that attacks the player character in a 3D virtual game space, the direction of the attack received by the player character from the enemy character is acquired based on player position information indicating the position of the player character and enemy position information indicating the position of the enemy character in the game space. Damage marks which are objects that indicate the attack direction are generated at positions corresponding to the attack direction in a player region set around the player character, and at least a part of the game space, including the player character and the damage marks, is displayed.

20 Claims, 10 Drawing Sheets

| Damage Mark ID | Flag | Counter | Firing Point | Impact Point |
|---|---|---|---|---|
| DMT1 | ON | 12 | (Xd, Yd, Zd) | (Xc, Yc, Zc) |
| DMT2 | ON | 5 | (Xb, Yb, Zb) | (Xa, Ya, Za) |
| DMT3 | OFF | 0 | | |
| DMC | ON | 5 | (Xb, Yb, Zb) | (Xa, Ya, Za) |

GAME MACHINE, PROGRAM FOR REALIZING GAME MACHINE, AND METHOD OF DISPLAYING OBJECTS IN GAME

This application is a Continuation of application Ser. No. 12/726,912, filed Mar. 18, 2010, which application is incorporated herein by reference.

BACKGROUND OF THE INVENTION

1. Field of the Invention

The present invention relates to a game machine that displays the direction of an attack from an enemy character in a readily recognizable manner. The present invention also relates to a computer program for realizing such a game machine, and further to a method of displaying certain objects in a game.

2. Description of the Related Art

Various shooting games have so far been developed in which the player operates a predetermined character (for example, a soldier, a fighter, a tank) to attack an opponent character by utilizing weapons such bullets, missiles, and laser beams. Hereinafter, the character operated by the player will be referred to as "player character", and the opponent character as "enemy character".

In the shooting game, generally, scores are added when the player activates the player character to attack the enemy character and successfully defeats (for example, when the bullet or missile directly strikes) the enemy character. On the other hand, when the player character is attacked by the enemy character, the player character, suffering the damage, loses some of its hit points (power) given in advance. When the accumulated damage exceeds a predetermined value and so the hit points of the player character become zero, the game is over. In order to avoid this, the player has to operate the player character to attack the enemy character while also trying to dodge the attack from the enemy character.

However, the display screen only displays a part of the virtual game space, and hence the player is unable to notice the presence of an enemy character located at a position not included in the display screen. The player cannot dodge the attack from the enemy character not displayed on the display screen, and cannot attack the enemy character either, since the presence of the enemy is not recognized. To alleviate such disadvantage against the player, some newly developed shooting games are provided with a function to notify the player of the position of an enemy character that is not displayed on the display screen (see Japanese Laid-open Patent Publication No. H11-70274, for example).

Specifically, a game displays on the screen a radar that indicates the position of the enemy character. The radar displays, for example, the position of the enemy character in the virtual game space viewed from above with the player character placed at the center, so that the player can recognize the relative position and direction of the enemy character with respect to the player character. Another game displays on the screen a marker that indicates the direction in which the enemy character has moved, when the enemy character moves out of the display screen. In view of such marker, the player can recognize the direction where the enemy character is located.

However, in the case where a number of enemy characters are present in the virtual game space, in the former game the radar indicates a number of positions of the enemy characters, and in the latter a number of markers appear on the display screen. Such display of many markers and the like makes the screen uncomfortable to watch, and besides the player feels perplexed with which of the enemy characters to focus on, since all of the enemy characters do not always attack at a time. Accordingly, it is not always best to notify the player of the position of all the enemy characters, on the display screen.

In the case where a number of enemy characters are present in the virtual game space, it is preferable, rather than notifying the player of the position of all the enemy characters, to notify the player of the position of only the enemy character that is making the attack, because thus the game screen can be simplified and the player can concentrate on dealing with the enemy character that is making the attack. In other words, all that the player is to do upon being attacked by the enemy character is either dodge a succeeding attack from the enemy character or attack that enemy character, and hence it becomes much easier to operate the player character. Accordingly, a shooting game has been developed that displays, when the player character is attacked by the enemy character, a damage mark indicating the direction of the attack from the enemy character (hereinafter, "attack direction").

FIG. 13 is a schematic drawing for explaining the conventional shooting game that displays the damage mark indicating the attack direction. FIG. 13 depicts a display screen showing a scene of the game, from the viewpoint of the player character in the three-dimensional (hereinafter, 3D) virtual game space.

The screen shown in FIG. 13 includes a machine gun GUN, the enemy character EC, and the damage mark DM. The machine gun GUN represents the machine gun carried by the player character, and the sight of the machine gun is displayed. The enemy character EC represents the character that attacks the player character. The damage mark DM is an arcuate mark that appears when the player character is attacked, in different directions and positions so as to indicate the attack direction. The damage mark DM appears on a display region formed along a circle formed about the center of the screen, in a shape corresponding to a quarter of that circle. The damage mark DM can be rotationally displayed at four different positions, namely an upper, lower, left and right position about the center of the circle. In FIG. 13, the damage mark DM is displayed at the upper position so as to bulge upward. The four display positions of the damage mark DM correspond to four regions about the player character in the virtual game space, namely a forward region, right region, left region, and rear region, with respect to the front of the player character. In other words, a circle is horizontally drawn about the player character, and the four regions defined by equally dividing such circle in four parts in reference to the front of the player character respectively correspond to the four display positions and four convex shapes of the arc of the damage mark DM (upper position and upwardly convex, right position and rightwardly convex, left position and leftwardly convex, and lower position and downwardly convex).

Thus, when the player character is attacked from the forward direction, the damage mark DM appears at the upper position in the upwardly convex shape, and when the attack comes from the right direction the damage mark DM appears at the right position in the rightwardly convex shape. When the player character is attacked from the left direction, the damage mark DM appears at the left position in the leftwardly convex shape, and when the attack comes from the rear direction, the damage mark DM appears at the lower position in the downwardly convex shape.

The scene shown in FIG. 13 represents the case that the player character has been attacked by the enemy character EC from the forward direction (in other words, the region where the enemy character EC is located is the forward region), and hence shows the damage mark DM at the upper position in the upwardly convex shape. Here, although the scene of FIG. 13 includes the enemy character EC itself, the damage mark DM equally appears when the player character is attacked, irrespective of whether the enemy character EC is displayed in the screen.

The player can therefore notice that the player character has been attacked in view of the appearance of the damage mark DM, and also recognize the attack direction according to the position and direction of the damage mark DM, to thereby efficiently dodge the succeeding attack from the enemy character EC that has made the attack and to attack that enemy character EC, based on the damage mark DM.

As stated above, the display region of the damage mark DM lies on the circle about the center of the screen (circle on a vertical plane). Accordingly, the player has to translate the attack direction indicated by the damage mark DM into one of the directions with respect to the player character in the virtual game space, and it is difficult to recognize the attack direction.

Also, the attack direction from the enemy character EC shown in FIG. 13 is indicated by the display positions and direction of the arc of the damage mark DM, which respectively corresponds to the four regions (four directions) defined by equally dividing a circle horizontally drawn about the player character in four parts, in reference to the front of the player character. Thus in the conventional games the attack direction in horizontal directions is displayed in directions on the vertical plane, in other words the image showing the game progress (image from the viewpoint of the player character) and the image indicating the attack direction from the enemy character EC (damage mark DM) are not displayed in a screen of a common direction, and therefore it is difficult for the player to recognize the attack direction from the enemy character EC based on the damage mark DM.

Besides, since the damage mark DM only two-dimensionally indicates the attack direction viewed from above the player character, the upward and downward direction (height) of the attack in the game image cannot be indicated. Even though a height difference is set in the game space field and the enemy character EC makes an attack from a higher position or lower position in any of the four regions, the display of the damage mark DM remains the same in either cases. Such display impedes the player from recognizing the upward and downward attack direction in the 3D virtual game space, thereby disabling the player to dodge the succeeding attack of the enemy character and to make a counter attack.

SUMMARY OF THE INVENTION

The present invention has been proposed under the foregoing circumstances. It is therefore an object of the present invention to provide a game machine that displays a damage mark that enables the player to readily recognize an attack direction in a 3D virtual game space, when the player character is attacked. Other objects of the present invention are to provide a computer program for realizing such a game machine, and to provide a method of displaying certain objects in a game.

According to a first aspect of the present invention, there is provided a computer readable storage medium comprising a program encoded and stored in a computer readable format to cause a computer to be used as a game machine that activates a player character operated by a human player and an enemy character that attacks the player character in a 3D virtual game space. The program is configured to cause the computer to operate as: a player position information acquisition unit that acquires player position information indicating a position of the player character in the virtual game space; an enemy position information acquisition unit that acquires enemy position information indicating a position of the enemy character in the virtual game space; an attack direction acquisition unit that acquires a direction of an attack received by the player character from the enemy character based on the player position information and the enemy position information; a damage mark generation unit that generates, when the player character is attacked by the enemy character, a damage mark which is an object that indicates the attack direction, at a position corresponding to the attack direction in a predetermined player region set around the player character; and a display controller that displays at least part of the 3D virtual game space including the player character and the damage mark.

Preferably, the player region may be provided in a circular shape about a reference point of the player character, when viewed from above the 3D virtual game space.

Preferably, the program may further cause the computer to operate as a calculation unit that calculates attack direction height information including height information of the attack direction, based on both height information in the player position information and height information in the enemy position information, wherein the damage mark generation unit generates the damage mark based on the attack direction height information calculated by the calculation unit.

Preferably, the enemy position information acquisition unit may acquire firing point information indicating an attack firing point in the virtual game space where the enemy character has fired the attack, as the enemy position information, and the player position information acquisition unit acquires impact point information indicating an attack impact point in the virtual game space where the player character has suffered the attack, as the player position information.

Preferably, the attack direction height information may be indicated by an angle of a straight line that passes the attack impact point and the attack firing point with respect to one of a horizontal plane and a vertical line extending in a direction of gravity.

Preferably, the damage mark generation unit may generate the damage mark with an inclination according to the attack direction height information.

Preferably, the damage mark generation unit may generate the damage mark at a height according to the attack direction height information.

Preferably, the damage mark generation unit may generate a plurality of types of damage marks.

Preferably, the plurality of types of damage marks include a first mark that indicates the attack direction, and a second mark that indicates the attack direction over a wider range than the first mark does.

Preferably, the damage mark generation unit may erase the first mark and the second mark after locating those marks in the virtual game space for a predetermined period of time, where the predetermined period for the first mark and that for the second mark are different.

Preferably, the damage mark generation unit may locate a predetermined number of the first marks and a predetermined number of the second marks, where the predetermined number of the first marks is greater than that of the second marks.

Preferably, the first mark and the second mark may be of such a shape that includes an indicator that indicates the attack direction, and the damage mark generation unit may superpose a central portion of the indicator of the second mark on the indicator of a first mark generated last.

Preferably, the damage mark may be of a conical shape, and a heightwise direction of the cone indicates the attack direction, and an apex of the cone is directed to the player character.

Preferably, the damage mark may be an arcuate portion of a circle about the position of the player character, corresponding to the attack direction.

Preferably, the damage mark generation unit may locate the damage mark only for a predetermined period of time after the player character is attacked.

Preferably, the damage mark generation unit may locate a predetermined number of the damage marks, and may erase an oldest damage mark when the number of damage marks exceeds the predetermined number upon generating a new damage mark.

Preferably, the damage mark generation unit may change the appearance of the damage mark according to a distance between the player character and the enemy character that has attacked the player character.

Preferably, the player region may be provided in a spherical shape about a reference point of the player character.

According to a second aspect of the present invention, there is provided a method of displaying objects in a game in which a player character operated by a human player and an enemy character that attacks the player character are activated in a 3D virtual game space. While playing this game, the human player is informed of an attack direction when the player character is attacked by the enemy character. The method comprises: a player position information acquisition step for acquiring player position information indicating a position of the player character in the virtual game space; an enemy position information acquisition step for acquiring enemy position information indicating a position of the enemy character in the virtual game space; an attack direction acquisition step for acquiring a direction of an attack received by the player character from the enemy character based on the player position information and the enemy position information; a damage mark generation step for generating a damage mark which is an object that indicates the attack direction, at a position corresponding to the attack direction in a predetermined player region set around the player character; and a display step for displaying at least part of the 3D virtual game space including the player character and the damage mark.

According to a third aspect of the present invention, there is provided a game machine for playing a game in which a player character operated by a human player and an enemy character that attacks the player character are activated in a 3D virtual game space. The game machine comprises: a player position information acquisition unit that acquires player position information indicating a position of the player character in the virtual game space; an enemy position information acquisition unit that acquires enemy position information indicating a position of the enemy character in the virtual game space; an attack direction acquisition unit that acquires a direction of an attack received by the player character from the enemy character based on the player position information and the enemy position information; a damage mark generation unit that generates, when the player character is attacked by the enemy character, a damage mark which is an object that indicates the attack direction, at a position corresponding to the attack direction in a predetermined player region set around the player character; and a display controller that displays at least part of the 3D virtual game space including the player character and the damage mark.

Other features and advantages of the present invention will become more apparent through detailed description given below referring to the accompanying drawings.

DETAILED DESCRIPTION OF THE PREFERRED EMBODIMENTS

Embodiments of the present invention will be described in details with reference to the accompanying drawings. Hereinbelow, the present invention is described as being applied to a home-use game machine for playing a shooting game (hereinafter, simply "game machine"), though the present invention is not limited to this particular application.

In the shooting game according to the present embodiment, the player is to operate a player character in a 3D virtual game space, to thereby fight against a plurality of enemy characters that attacks the player character. The player activates the player character to attack the enemy character with weapons such as a machine gun and hand grenades, to defeat the enemy character. On the other hand, the enemy characters also attack the player character with similar weapons. When the player character receives an attack, the player character suffers a damage, resulting in a decrease in hit points given in advance to the player character. The accumulated amount of damage exceeds a predetermined value and the hit points of the player character become zero, the game is over. Accordingly, when an attack is received from the enemy character, the player has to operate the player character so as to dodge the succeeding attack or to make a counter attack against the enemy character. In this embodiment, when an attack is received from the enemy character, a damage mark is displayed so as to indicate from which direction in the 3D virtual game space the enemy character has made the attack (attack direction).

Objects (i.e., various elements appearing in the virtual game space, including the player character, the enemy character, the damage marks, etc.) are arranged in the 3D virtual game space, and the player character moves in the 3D virtual game space according to the operation by the player. Other objects are either fixed in the 3D virtual game space, or set to move according to the game program. The objects in the 3D virtual game space are projected in a form of a two-dimensional image by a projection process, and displayed in a display screen. The damage mark is also an object, and located in the 3D virtual game space and displayed in the display screen by projection. The damage mark is located at a position corresponding to the attack direction viewed from above in the 3D virtual game space. The damage mark also indicates whether the enemy character has made the attack from a position as high as the player character, or higher or lower than the player character. Hereinafter, a component of the attack direction that indicates the height will be referred to as "height component in the attack direction". In this embodiment, the appearance (inclination) of the damage mark is changed in three angles, according to the height component in the attack direction.

Figure 1:
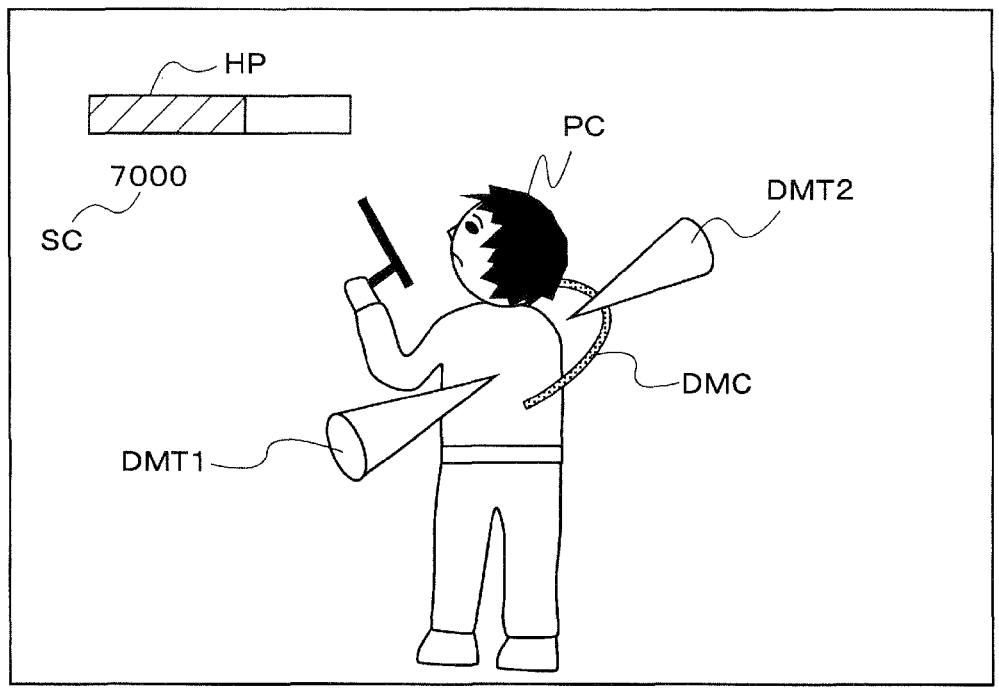
FIG. 1 is a schematic drawing showing a scene of a shooting game according to an embodiment of the present invention.

FIG. 1 is a drawing for explaining the damage mark, and depicts a displayed image of a scene in the shooting game according to this embodiment. The shooting game according to this embodiment is what is known as a third-person shooting game (from a viewpoint of a third person), and hence a birds-eye image including the player character and a periphery thereof, viewed from an upper position behind the player character, is displayed. The displayed image shown in FIG. 1 includes the player character PC, the score SC, the Hit Point HP, an arcuate damage mark DMC, and triangular damage marks DMT1, DMT2. The Hit Point HP is displayed at a left upper position of the display screen, and the score SC is displayed right under the Hit Point HP. The player character PC is displayed in a central portion of the display screen. The arcuate damage mark DMC and the triangular damage marks DMT1, DMT2 are displayed in a predetermined region provided around the player character PC. It is to be noted that the triangular damage marks DMT1, DMT2 correspond to the first mark according to the present invention, and the arcuate damage mark DMC corresponds to the second mark according to the present invention.

The player character PC is the character to be operated by the player, and selected and entered by the player upon starting the game. The selection of the player character by the player may be skipped, and a predetermined character may be provided. The score SC represents the score gained by the player, and is acquired and added up each time the player character attacks or defeats the enemy character. The Hit Point HP indicates the level of the hit points of the player character PC, which is decreased each time an attack of the enemy character is received.

The arcuate damage mark DMC and the triangular damage marks DMT1, DMT2 serve to indicate the attack direction from the enemy character, when the enemy character has made the attack. Here, the arcuate damage mark and the triangular damage marks will be collectively referred to as "damage mark".

Figure 4:
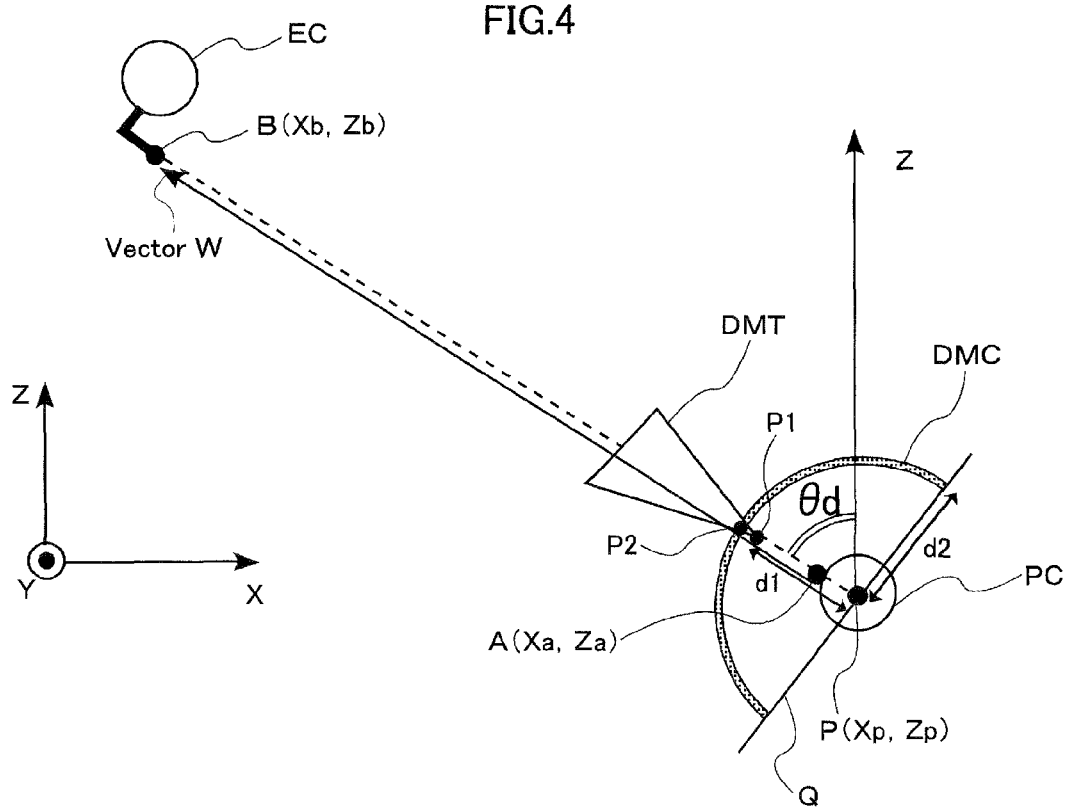
FIG. 4 is a diagram for explaining calculation of an angle θd of an attack direction in an XZ-plane in a virtual game space, with respect to a Z-axis.

The arcuate damage mark DMC serve to roughly indicate the direction of the attack that the player character PC has received. The arcuate damage mark DMC is an arcuate object having a predetermined width and thickness, formed about a player character position P indicating the position of the player character PC in the 3D virtual game space (for example, center of the upper body of the player character PC). Here, the edge of the arcuate damage mark DMC opposite to the player character PC corresponds to the "indicator" that indicates the attack direction according to the present invention, and a central position P2 (Ref. FIG. 4) to be later described to the "center of the indicator" according to the present invention. In this embodiment, the arcuate damage mark DMC is displayed for one second after the player character PC is attacked. Such display period is not limited to one second. In this embodiment, when a succeeding attack is received while the arcuate damage mark DMC is displayed, the arcuate damage mark DMC corresponding to the preceding attack is erased and only the arcuate damage mark DMC corresponding to the succeeding attack is displayed, in order to prevent the display screen from becoming complicated. Accordingly, when the player character PC is successively attacked, only the arcuate damage mark DMC corresponding to the latest attack is displayed. However, the arcuate damage mark DMC corresponding to the preceding attack may be kept displayed together with the arcuate damage mark DMC corresponding to the succeeding attack, when the attacks are successively received.

The triangular damage marks DMT1, DMT2 serve to more precisely indicate the direction of the attack received by the player character PC. To be more detailed, the range of the attack direction indicated by the triangular damage marks DMT1, DMT2 (range in a horizontal direction, not in a height direction) is narrower than the attack direction indicated by the arcuate damage mark DMC, and hence the triangular damage marks DMT1, DMT2 can indicate the attack direction more precisely than the arcuate damage mark DMC. Here, a bottom portion of the triangular damage marks DMT1, DMT2 corresponds to the "indicator" that indicates the attack direction according to the present invention. The triangular damage marks DMT1, DMT2 are conical objects with the bottom portion directed to the attack direction in the 3D virtual game space, and with the apex directed to the player character PC. Since the objects in the 3D virtual game space are displayed in the two-dimensional display screen by projection, the triangular damage marks DMT1, DMT2 appear in a generally triangular shape in the display screen. In the case where the attack is made from right behind the player character PC, only the bottom portion of the cone is displayed, and hence a circle is displayed. Thus, because of the conical shape, the triangular damage marks DMT1, DMT2 are displayed in a circle when viewed from behind and in a triangle when viewed from other directions, and thereby presents appropriate appearances in all angles.

The triangular damage mark DMT2 appears based on the latest attack, and the triangular damage mark DMT1 based on the immediately preceding attack. In this embodiment, the triangular damage marks are displayed up to three pieces to thereby prevent complication of the display screen, and the triangular damage marks based on the earlier attacks are erased. In other words, three triangular damage marks are displayed in the screen at maximum (to collectively refer to the triangular damage marks irrespective of the attack sequence, the expression of "triangular damage mark DMT" is employed). Here, the number of triangular damage marks to be displayed is not limited to three, but may be just one or two, or four or more. Also, such limitation on the number may be removed.

In this embodiment, the triangular damage marks DMT are displayed for 0.5 seconds after the player character PC is attacked, however such display period is not limited to 0.5 seconds. Also, the triangular damage marks DMT are set to be displayed for a shorter time than the arcuate damage mark DMC in this embodiment, for the following reasons. First, displaying the triangular damage marks DMT for a longer time makes the display screen complicated. Also, since the player character PC and the enemy character are moving in the virtual game space, the enemy character may no longer be found in the direction indicated by the triangular damage mark DMT kept displayed for a long time. Further, because of the processing speed and communication lag of the game machine, the details of which will be subsequently described, the enemy character may no longer remain in the direction indicated by the triangular damage mark DMT. For such reasons, the triangular damage marks DMT which indicate the precise direction are displayed for a shorter time, and the arcuate damage mark DMC which roughly indicate the attack direction is displayed for a longer time. However, the triangular damage mark DMT and the arcuate damage marks DMC may be displayed over the same period of time.

It is for the following reason that not only the triangular damage marks DMT but also the arcuate damage mark DMC is displayed. In the case where the player character PC receives the attack from the forward direction, the triangular damage mark DMT is hidden by the player character PC, and hence the player may fail to notice the attack. Accordingly, in this embodiment, the arcuate damage mark DMC of such a size that is not hidden by the player character PC is displayed at a time, to thereby roughly indicate the direction of the latest attack. Also, in the case where the game machine is communicably connected to another game machine to thereby have a fight between the player character of the game machine and a player character (enemy character) of such another game machine, the enemy character may no longer remain in the direction indicated by the triangular damage mark DMT, because of the communication lag (delay produced in communication) between the game machines. Even in such a case, the arcuate damage mark DMC which roughly indicates the attack direction can indicate the position of the enemy character, thus preventing degradation in reliability of the damage mark, on the part of the player. Here, the present invention is not limited to displaying the both damage marks, but includes displaying just either thereof. Also, three or more types of damage marks may be displayed. The shape and size of the damage marks are not specifically limited.

The triangular damage marks DMT and the arcuate damage mark DMC also indicate the height component in the attack direction. The triangular damage mark DMT1 is an object in the virtual game space, oriented such that the height direction of the cone (direction of a line perpendicular to the bottom portion of the cone and passing the apex thereof) is horizontal (parallel to a horizontal plane) and that the bottom portion is parallel to a vertical direction. The triangular damage mark DMT1 thus oriented indicates that the player character PC has been attacked by the enemy character located at a position of generally the same height. The triangular damage mark DMT2 is an object in the virtual game space, oriented such that the height direction of the cone is upwardly tilted from a horizontal direction, and that the bottom portion is upwardly tilted from a vertical direction. The triangular damage mark DMT2 thus oriented indicates that the player character PC has been attacked by the enemy character located at a higher position. In this embodiment, the triangular damage marks DMT are displayed in three different angles according to the height component in the attack direction. More specifically, in the case where the player character PC is attacked from a direction higher than a predetermined angle (for instance, 15°) with respect to a horizontal direction, the cone is displayed with the height direction upwardly inclined by 30° for example, and when the player character PC is attacked from a direction lower than a predetermined angle (for instance, −15°) with respect to a horizontal direction, the cone is displayed with the height direction downwardly inclined by 30°, for example.

Likewise, the arcuate damage mark DMC is displayed in three different angles according to the height component in the attack direction. The arcuate damage mark DMC shown in FIG. 1 is an arcuate object obliquely inclined upward in the virtual game space, and indicates that the player character PC has been attacked by the enemy character located at a higher position than the player character. The foregoing angles are merely exemplary, and may be appropriately determined according to the situation. Also, the inclination of the damage mark may be displayed in finer increments instead of three angles, or may be continuously changed according to the angle of the attack direction with respect to a horizontal direction.

The position where the damage mark is to be shown is determined according to the part of the player character PC that the bullet from the enemy character has hit, and the position from which that bullet has been fired. Also, a coordinate system is set in the 3D virtual game space. Hereinafter, the coordinate system set in the virtual game space will be referred to as "world coordinate system".

Figure 2:
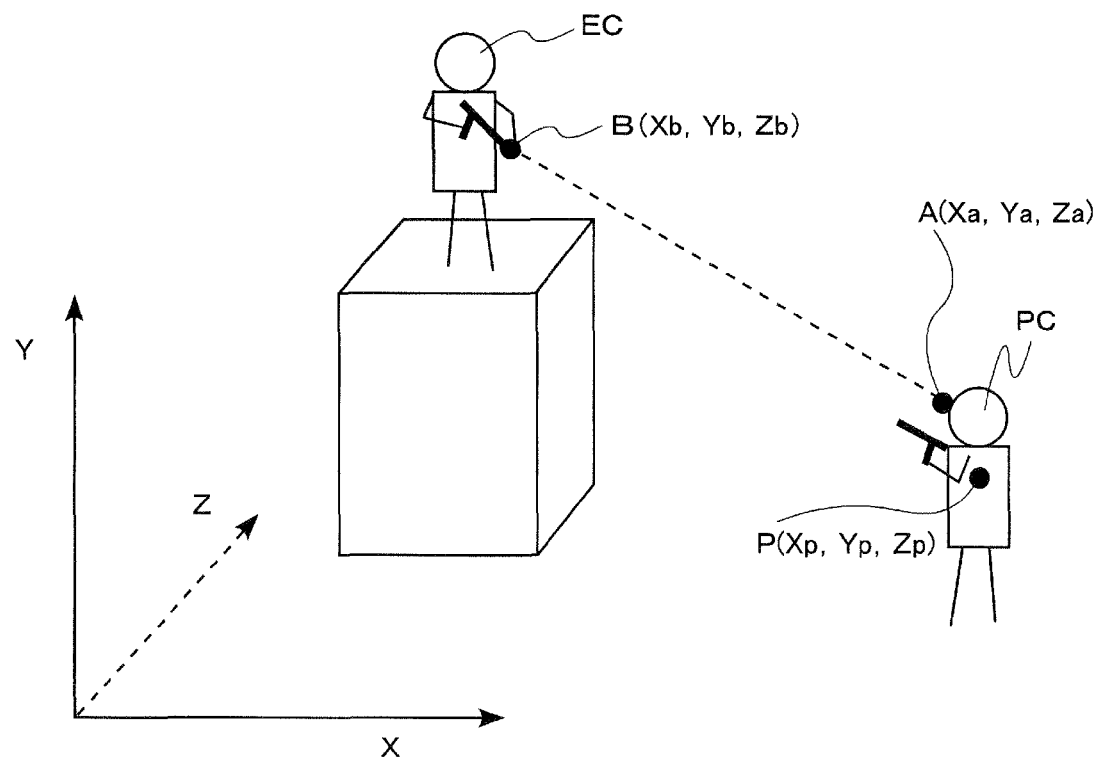
FIG. 2 is a schematic drawing for explaining a world coordinate system set in a 3D virtual game space.

FIG. 2 is a schematic drawing for explaining the world coordinate system set in the 3D virtual game space. The Y-axis of the world coordinate system corresponds to a vertical direction of the virtual game space, and the XZ-plane of the world coordinate system corresponds to a horizontal plane of the virtual game space. Positions in the virtual game space are indicated based on the world coordinate system. The locations of the objects are also indicated based on the world coordinate system. For example, the position of the player character PC is denoted by a player character position coordinate P (Xp, Yp, Zp) representing the center of the upper body of the player character.

The objects are constituted of a plurality of polygons (for example, triangles). The polygons each bear information on relative position thereof with respect to the relevant object, the coordinate of each polygon is determined based on the coordinate of the object (in the case where the polygon is a triangle, the coordinate of the three apices). However, the respective polygon coordinate of the damage mark is determined in reference to the player character position coordinate P (Xp, Yp, Zp). The three-dimensional coordinates based on the world coordinate system of the polygons are converted by projection into the two-dimensional coordinate system corresponding to the display screen (hereinafter, "screen coordinate system"), so that upon drawing the polygons on the converted coordinate the objects on the virtual game space are drawn on the display screen.

Figure 3:
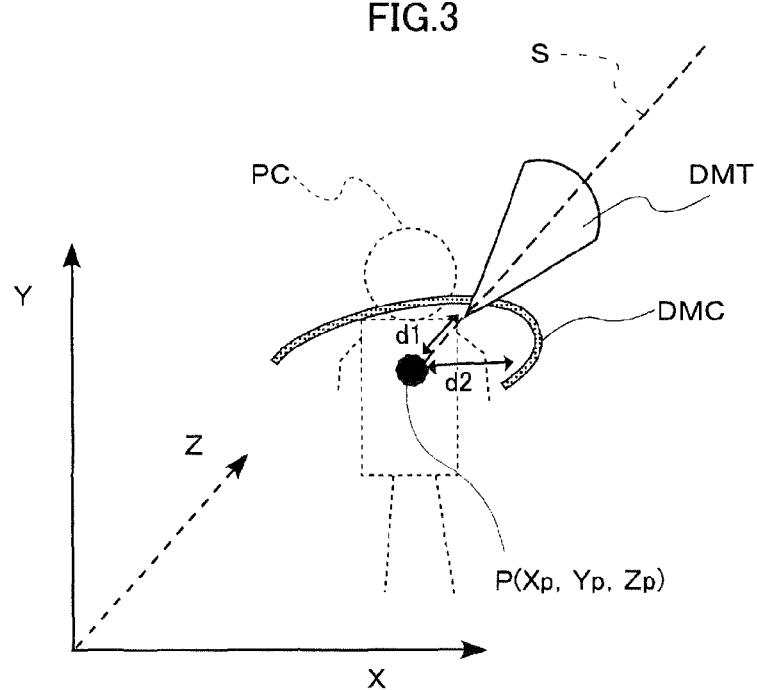
FIG. 3 is a schematic drawing for explaining a relationship between a player character position coordinate P, and an arcuate damage mark DMC and triangular damage marks DMT.

FIG. 3 is a schematic drawing for explaining a relationship between the player character position coordinate P, and the arcuate damage mark DMC and triangular damage marks DMT. The arcuate damage mark DMC is an arcuate object (for example, semicircular) which is a part of a circle with a predetermined radius (distance d2) about the coordinate P (Xp, Yp, Zp) formed parallel to the XZ-plane (horizontal plane), and which intersects at its midpoint with a line S extending from the coordinate P parallel to the Z-axis. The triangular damage marks DMT are conical objects having the apex at a point away from the coordinate P by a predetermined distance d1 in the Z-axis direction, with the height direction aligned with the line S extending from the coordinate P parallel to the Z-axis.

The arcuate damage mark DMC and the triangular damage marks DMT are rotationally located about the coordinate P (Xp, Yp, Zp) based on the attack direction from the enemy character.

FIG. 2 depicts the situation that the bullet from the machine gun of the enemy character EC located at a higher position has hit the player character PC. Here, the decision that the bullet has hit the player character PC is made based on agreement between the coordinate of the bullet and the coordinate of one of the polygons constituting the player character PC (coordinate of the region surrounded by the coordinates of the apices of the polygon). In this case, an impact point A of the bullet corresponds to the coordinate of the bullet where the bullet has hit the player character PC, and such coordinate will be denoted by A (Xa, Ya, Za). In FIG. 2, the coordinate A (Xa, Ya, Za) is on the head of the player character PC. The position B from which the bullet has been fired corresponds to the position where the point of the machine gun of the enemy character EC is located when the bullet is fired, and the coordinate of such position will be denoted by B (Xb, Yb, Zb). The damage marks are located based on the player character position P (Xp, Yp, Zp), the impact point A (Xa, Ya, Za), the firing position B (Xb, Yb, Zb). Here, the firing position B (Xb, Yb, Zb) may be the position where the point of the machine gun of the enemy character EC is located when the bullet hits the player character PC.

FIG. 4 is a diagram for explaining the calculation of an angle $\theta d$ of the attack direction in the XZ-plane in the virtual game space, with respect to the Z-axis. FIG. 4 represents the projection of the virtual game space shown in FIG. 2 on the XZ-plane. The attack direction projected on the XZ-plane is indicated by a vector directed to the firing position B (Xb, Zb) from the impact point A (Xa, Za). Such vector W may be expressed as (Xb-Xa, Zb-Za). When the unit vector in the Z-direction is expressed as vector Z=(0, 1), the inner product of the vector W and the vector Z can be expressed as the following equation (1). Accordingly, the angle $\theta d$ can be calculated through the equation (2) given below.

$$\vec{w} \cdot \vec{z} = |\vec{w}||\vec{z}| \cdot \cos\theta d \quad (1)$$

$$\theta d = \text{Arccos} \frac{\vec{w} \cdot \vec{z}}{|\vec{w}||\vec{z}|} = \text{Arccos} \frac{Zb - Za}{\sqrt{(Xa - Xb)^2 + (Za - Zb)^2}} \quad (2)$$

where $\vec{W}$ represents the vector W, and $\vec{z}$ the vector Z.

The triangular damage marks DMT and the arcuate damage mark DMC are located such that the respective centers (P1 and P2) are rotated about the Y-axis by the angle $\theta d$ with respect to the Z-axis, with the rotational center placed at the player character position coordinate P (Xp, Yp, Zp). Here, the central position P1 of the triangular damage mark DMT is, for example, the apex of the cone (including the vicinity of the apex), and the central position P2 of the arcuate damage mark DMC is the midpoint of the arc (including the vicinity of the midpoint). However, the central positions P1, P2 may be an arbitrary point on the triangular damage marks DMT and the arcuate damage mark DMC, without limitation to such setting.

As stated above, when the player character PC is viewed along a vertical direction (Y-axis direction), the central position P1 of the triangular damage mark DMT falls on a circle R1 (not shown) formed about the player character position coordinate P (Xp, Yp, Zp) with a radius corresponding to the predetermined distance d1, and the triangular damage mark DMT is located about the central position P1. In other words, the region along the circle R1 constitutes the locating region of the triangular damage mark DMT. Likewise, the central position P2 of the arcuate damage mark DMC falls on a circle R2 (not shown) formed about the player character position coordinate P (Xp, Yp, Zp) with a radius corresponding to the predetermined distance d2, and the arcuate damage mark DMC is located about the central position P2. In other words, the region along the circle R2 constitutes the locating region of the arcuate damage mark DMC.

Figures 5, 6:
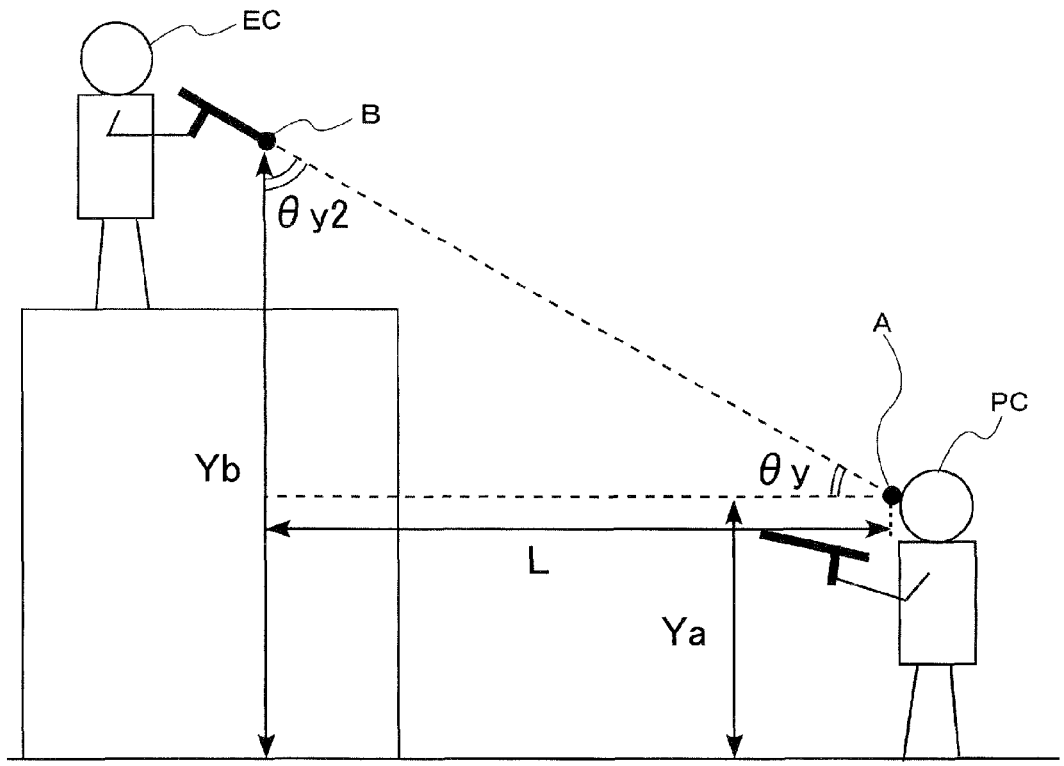
FIG. 5 is a diagram for explaining calculation of an angle θy of the attack direction in the virtual game space with respect to the XZ-plane.
FIG. 6 is a table for explaining a damage mark.

FIG. 5 is a diagram for explaining calculation of an angle $\theta y$ of the attack direction in the virtual game space with respect to the XZ-plane (horizontal plane). FIG. 5 represents a side view of the virtual game space shown in FIG. 2. The Y coordinate of the impact point A is Ya, and that of the firing point B is Yb. These Y coordinates represent the height from a horizontal plane. The distance L between the firing point B and the impact point A projected on the horizontal plane can be calculated through the following equation (3). Accordingly, the angle $\theta y$ of the attack direction with respect to the XZ-plane in the virtual game space can be calculated with the following equation (4).

$$L = \sqrt{(Xa - Xb)^2 + (Za - Zb)^2} \quad (3)$$

$$\theta y = \text{Arctan} \frac{Yb - Ya}{L} = \text{Arctan} \frac{Yb - Ya}{\sqrt{(Xa - Xb)^2 + (Za - Zb)^2}} \quad (4)$$

The triangular damage marks DMT and the arcuate damage mark DMC are located at a position rotated by a certain angle, which is to be determined according to the angle $\theta y$, about an axis Q (referring to FIG. 4, an axis orthogonal to the vector W and horizontally extending so as to pass the player character position P) in the Y-axis direction. More specifically, in the case where $\theta y$ is not greater than $-15°$, the damage marks are located with an inclination of 30° in the negative Y-axis direction; in the case where $\theta y$ is greater than $-15°$ but smaller than 15°, the damage marks are located without an inclination in the Y-axis direction, and in the case where $\theta y$ is not smaller than 15°, the damage marks are located with an inclination of 30° in the positive Y-axis direction.

As stated above, the central position P1 is also located on a point on the circle R1 rotated by ±30° about the axis Q, and the triangular damage mark DMT is located about the central position P1. In other words, a region on a circle R1' (not shown) formed parallel to the circle R1 about a point distant by d1·sin(30°)=(½)d1 from the Y coordinate of the center of the circle R1, as well as a region on a circle R1' (not shown) formed parallel to the circle R1 about a point distant by d1·sin(-30°)=-(½)d1 from the Y coordinate of the center of the circle R1, also constitute the locating region of the triangular damage mark DMT. Here, the circle R1' and the circle R1" constitute circles having a radius of ($\sqrt{3}$/2)d1, formed parallel to the XZ-plane about the point (Xp, Yp±(½)d1, Zp).

Likewise, the central position P2 is also located on a point on the circle R2 rotated by ±30° about the axis Q, and the arcuate damage mark DMC is located about the central position P2. In other words, a region on a circle R2' (not shown) formed parallel to the circle R2 about a point distant by)d2·sin (30°)=(½)d2 from the Y coordinate of the center of the circle R2, as well as a region on a circle R2" (not shown) formed parallel to the circle R2 about a point distant by)d2·sin (-30°)=-(½)d2 from the Y coordinate of the center of the circle R2, also constitute the locating region of the arcuate damage mark DMC. Here, the circle R2' and the circle R2" constitute circles having a radius of ($\sqrt{3}$/2)d2, formed parallel to the XZ-plane about the point (Xp, Yp±(½)d2, Zp).

The coordinate of the impact point A and the firing point B at the moment that the player character PC has been attacked (the bullet has hit the player character PC) is recorded in a damage mark table. The damage mark table is used to record therein the information necessary for displaying the damage mark.

FIG. 6 is a table for explaining the damage mark. The damage mark table is provided in a storage region of the game machine upon starting the game, and is overwritten through the damage mark processing to be described later. In the damage mark table, a damage mark ID, a drawing flag, a counter, the firing point coordinate, and the impact point coordinate are recorded.

The damage mark ID represents each damage mark. DMT1, DMT2, DMT3 stand for the three triangular damage marks. Since up to three triangular damage marks are displayed in this embodiment, three IDs are employed. DMC stands for the arcuate damage mark.

The drawing flag serves to decide whether the damage mark is to be drawn. The damage mark bearing an ON-state drawing flag is drawn, and the damage mark bearing an OFF-state drawing flag is not drawn. When the player character is attacked, the drawing flag of the damage mark ID "DMC" is turned ON, and the drawing flag of one of the damage mark IDs "DMT1", "DMT2", "DMT3" is turned ON. Also, the drawing flag turned ON is turned OFF after a predetermined period of time. The switching between ON and OFF will be subsequently described with reference to the damage mark processing.

The counter serves to measure the time after the drawing flag of the damage mark is turned ON, and actually counts the number of frames drawn. In this embodiment the drawing is executed every 1/30 second, and hence counting such drawn frames leads to measuring the time. For example, when the frame count reaches 15, 0.5 seconds have elapsed. The timing for drawing is not limited to every 1/30 second. Also, the timing for drawing does not have to be fixed, but may vary. For example, during a phase through which the drawing is executed every 1/60 second, each frame may be counted as 0.5. The actual time may be measured, instead of counting the frames.

The impact point coordinate and the firing point coordinate are the coordinates in the world coordinate system, of the impact point A at the moment that the player character PC has been attacked (the bullet has hit the player character PC), and of the firing point B where that bullet has been fired. In this embodiment, the impact point coordinate corresponds to the player position information and the impact point information according to the present invention, and the firing point coordinate corresponds to the enemy position information and the firing point information according to the present invention.

Utilizing the foregoing equations (2) and (4), the angles θd and θy are calculated based on the firing point coordinate and the impact point coordinate recorded in the damage mark table. Here, the angles θd and θy correspond to the direction of the attack received by the player character from the enemy character according to the present invention. Also, although the angle θy corresponds to the attack direction height information according to the present invention, the angle θy2 in FIG. 5 may be utilized as the attack direction height information according to the present invention. The triangular damage marks DMT and the arcuate damage mark DMC are located in the virtual game space based on the angle θd, and the angle θy or θy2. The triangular damage marks DMT and the arcuate damage mark DMC located in the virtual game space are subjected to projection transformation (coordinate transformation), together with other objects, and then displayed on the display screen.

Although the foregoing description refers to the firing point and the impact point of the bullet of the machine gun carried by the enemy character, the attack may be otherwise made. The attack with a rifle or a pistol can be processed in the same way, and this also applies to an attack with a laser beam gun which does not fire a bullet, or with an arrow. This further applies to an attack with a projectile weapon such as a hand grenade or throwing a stone.

A hardware construction according to this embodiment will now be described hereunder.

Figure 7:
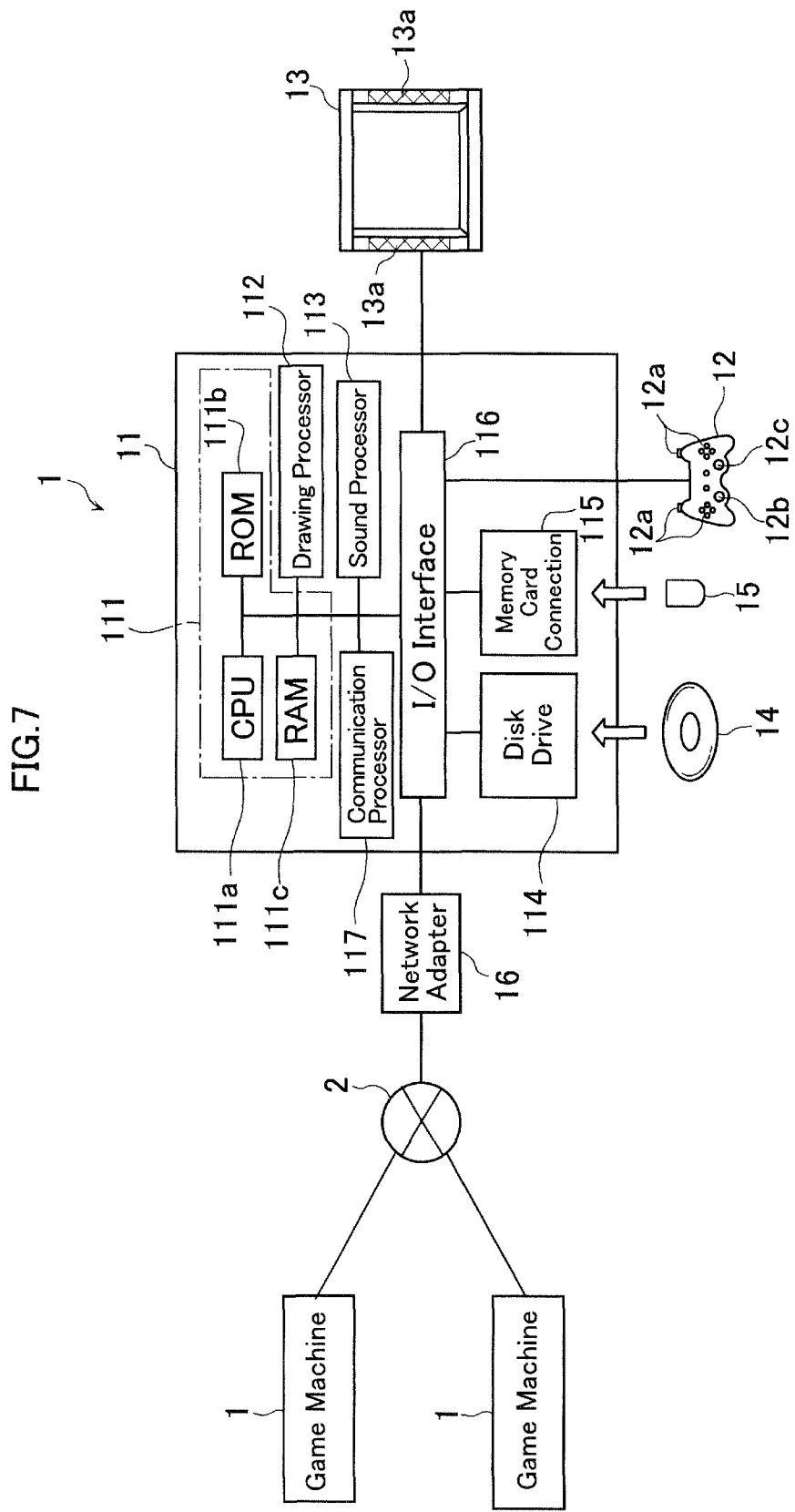
FIG. 7 is a block diagram showing a configuration of a game machine according to the present invention.

FIG. 7 is a block diagram showing a configuration of the game machine according to the present invention. The game machine 1 includes a main body 11, an operation controller 12, and a monitor 13. The operation controller 12 and the monitor 13 are connected to the main body 11 through an exclusive cable. A disk 14 containing a game program and game data can be loaded into the main body 11. When necessary, a memory card 15 for storing the game data can also be loaded into the main body 11.

The main body 11 includes a control unit 111, a drawing processor 112, a sound processor 113, a disk drive unit 114, a memory card connection unit 115, an I/O interface unit 116, and a communication processor 117. To the control unit 111, the drawing processor 112, the sound processor 113, the I/O interface unit 116, and the communication processor 117 are connected. To the I/O interface unit 116, the disk drive unit 114, the memory card connection unit 115, the operation controller 12, and the monitor 13 are connected.

In the game machine 1, the disk 14 containing the software of the foregoing shooting game is loaded in the disk drive unit 114, so that the game program and the game data, encoded and stored in a computer readable format, are read out into a RAM 111c (to be described later) in the control unit 111, from the disk drive unit 114. Execution of the game program by a CPU 111a (to be described later) enables a player to enjoy the game content. The player manipulates operation tools 12a to 12c (to be described later) on the operation controller 12, to thereby operate the player character in the game.

The game data in the disk 14 includes characters such as the player character and the enemy character, the damage marks to be displayed when an attack is received from the enemy character, image data such as background landscape, data for sound effects, tables to be looked up for progressing the game and drawing, and so forth.

The control unit 111 includes a microcomputer that controls the overall action of the main body 11. The microcomputer includes a CPU 111a, a ROM 111b, RAM 111c and so on, which are mutually connected through a bus line.

The CPU 111a executes the game program read out by the disk drive unit 114 from the disk 14 into the RAM 111c, to thereby integrally control the progress of the game. To be more detailed, when the player manipulates the operation controller 12 to thereby input an operating signal, the CPU 111a executes a predetermined process for progressing the game according to the game program. The CPU 111a displays the processing result on the monitor 13 in an image, and outputs the result through a speaker 13a (described later) of the monitor 13 in a form of the sound effects.

The ROM 111b contains a basic function of the game machine 1 such as disk loading, and basic programs indicating procedure for reading out the game program and the game data from the disk 14. The CPU 111a activates the disk drive unit 114 according to the basic program in the ROM 111b once the disk 14 is loaded in the disk drive unit 114, to thereby read out the game program and the game data from the disk 14 into the RAM 111c, thus setting the game machine ready for starting the game.

The RAM 111c serves to provide an area in which the game program and the game data (including the image data such as the damage marks) read out from the disk 14 by the disk drive unit 114 is to be stored, and a work area for the CPU 111*a* to execute the game program. In the work area, the damage mark table (Ref. FIG. 6) and so forth are stored.

The game program is constituted of a plurality of programs, for example a game progress program for controlling the action of the player character displayed on the monitor 13 based on the operating signal input by the player through the operation controller 12, and a graphic control program for controlling the image to be displayed on the monitor 13.

The CPU 111*a* reads out the game program and image data from the disk 14 into the RAM 111*c* based on the operating signal input by the player through the operation controller 12 when necessary, and processes such data and executes the game program to thereby decide the content of the image to be displayed on the monitor 13. The CPU 111*a* also decides whether the attack from the enemy character has hit the player character, to thereby decide the display of the damage mark through damage mark processing to be subsequently described.

The drawing processor 112 serves to execute various calculations necessary for the drawing process. The CPU 111*a* outputs a drawing instruction to the drawing processor 112, for example every 1/30 second. In response thereto, the CPU 111*a* decides the image to be displayed on the monitor 13, and reads out the image data necessary for drawing that image (polygon data of the objects such as the characters and the damage marks, and background data) and light source data from the RAM 111*c*, to provide such data to the drawing processor 112. The CPU 111*a* also provides the drawing processor 112 with the position data of the characters, information necessary for displaying the damage marks (specifically, the angle data θd and θy of the attack direction calculated through the equations (2) and (4)), and the operating signal input through the operation controller 12.

The drawing processor 112 calculates the data necessary for drawing (positional relationship between the objects and the background, the coordinate of the polygons constituting the objects in the screen of the monitor 13, texture corresponding to the respective polygons, and data such as reflection characteristic of the polygons) based on the image data and the operating signal provided from the CPU 111*a*, and generates the image data for one frame of the display screen on a VRAM (not shown) in the drawing processor 112 according to the calculation result. The image data for the display screen thus generated is output as an image signal to the monitor 13, for example every 1/30 second, thus to be displayed thereon.

The sound processor 113 serves to execute various calculations necessary for generating sounds and voices such as the sound effects. The CPU 111*a* outputs the sound instruction to the sound processor 113, upon deciding the sound effects or a BGM sound to be output through the speaker 13*a* of the monitor 13. The sound processor 113 reads out the sound data of the sound effects or the BGM from the RAM 111*c* according to the sound instruction from the CPU 111*a*, and outputs the sound through the speaker 13*a* after executing a predetermined processing and D/A conversion.

The disk drive unit 114 serves to read out the game program and the game data contained in the disk 14, based on a loading instruction (read out instruction designating the game program and the game data to be loaded) from the CPU 111*a*.

The memory card connection unit 115 serves to write the information on the game progress into the memory card 15, and to read out such information therefrom. The CPU 111*a* stores, upon receipt of a data-save instruction from the player during or at an end of the game, the information on the game progress (including types of the game characters set up by the player, scores of battles, and various privileges such as points or items acquired) in the memory card 15 through the memory card connection unit 115. The information on the game progress thus stored in the memory card 15 is read out into the RAM 111*c* before starting a subsequent session of the game.

The I/O interface unit 116 serves to transmit to the control unit 111 the game program and the game data read out by the disk drive unit 114 and the memory card connection unit 115 and the operating signal input through the operation controller 12, and to transmit the image signal and the audio signal from the control unit 111, the drawing processor 112, and the sound processor 113, to the monitor 13.

The communication processor 117 serves to control data transmission and reception when executing communication with another game machine 1 through a network. The communication processor 117 transmits the operating signal input through the operation controller 12 and the signal output from the CPU 111*a* to the another game machine 1 through the network, and receives a signal transmitted from the another game machine 1 through the network, to thereby input such signal to the CPU 111*a*.

The operation controller 12 is to be manipulated by the player for activating the characters and executing various settings related to the game, and includes a plurality of buttons 12*a*, a left lever 12*b* and a right lever 12*c*. Once the player manipulates the operation controller 12, the operating signal is transmitted to the control unit 111, so that the character displayed on the monitor 13 performs a predetermined action. Examples of the predetermined actions include moving actions such as running, crouching, and jumping, and attacking an enemy with a weapon. The moving action is primarily controlled with the left lever 12*b*, and the attacking action with the buttons 12*a* and the right lever 12*c*.

The monitor 13 serves to display a screen showing the game progress based on the image signal transmitted from the main body 11, and to output the sounds such as the sound effects through the speaker 13*a* based on the audio signal transmitted from the main body 11. The monitor 13 is constituted of, for example, a TV receiver with an external input terminal for receiving the image signal and the audio signal.

The disk 14 is for example an optical disk such as a DVD-ROM or a CD-ROM. The disk 14 contains, together with the image data, the game program and various data necessary for executing the game program. The memory card 15 is a non-volatile recording medium on which data can be overwritten, such as a flash memory. Since the data on the work area in the RAM 111*c* is erased when the main body 11 of the game machine is turned off, the memory card 15 stores therein the information on the game progress that has to be preserved, out of the records in the work area of the RAM 111*c*.

The game machine 1 can be connected to a network line 2 such as the internet, through a network adapter 16. By such connection, the game can be played between a plurality of game machines 1 through the network line 2 (what is known as "online game"). Although this embodiment exemplifies the game to be played with a single game machine 1, the present invention is also applicable to the online game.

Referring now to flowcharts shown in FIGS. 8 to 12, description will be given on the damage mark processing to be executed by the CPU 111*a* of the game machine according to the present invention.

Figure 8:
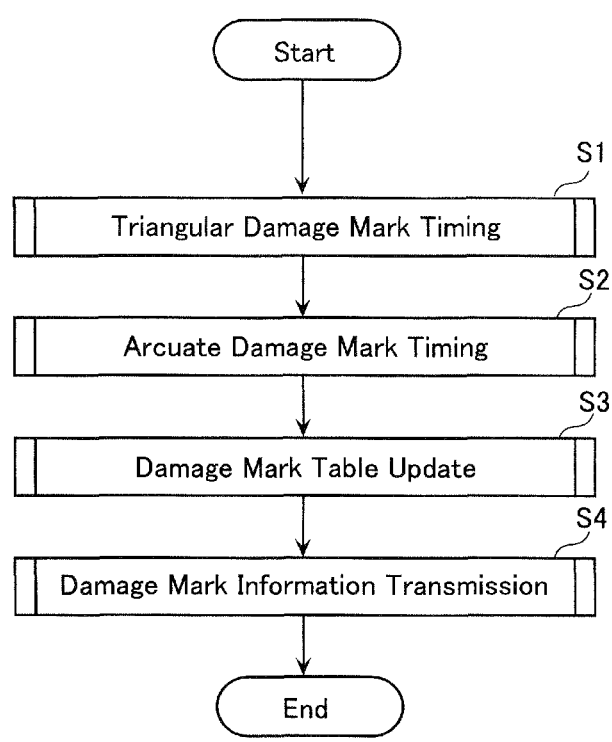
FIG. 8 is a flowchart showing steps of damage mark processing.

FIG. 8 is a flowchart showing steps of damage mark processing. The damage mark processing includes calculating the information necessary for displaying the damage mark on the display screen (hereinafter, "damage mark information"), and transmitting such information to the drawing processor 112. Since the drawing processor 112 needs to receive the damage mark information for executing the drawing, the damage mark processing is executed before the CPU 111a transmits the drawing instruction to the drawing processor 112. Thus, the damage mark processing is also executed every 1/30 second, as the drawing process.

First, a triangular damage mark timing process is executed (S1). This is a process of measuring the time after the triangular damage mark is displayed, the details of which will be described later. Then an arcuate damage mark timing process is executed (S2). This is a process of measuring the time after the arcuate damage mark is displayed, the details of which will be described later.

The above is followed by a damage mark table update process (S3). This is a process of deciding whether the player character has received an attack (suffered a damage), thereby updating the damage mark table (Ref. FIG. 6) in the affirmative case, the details of which will be described later. A damage mark information transmission process is then executed (S4), and the damage mark processing is completed. The damage mark information transmission process includes calculating the damage mark information necessary for the drawing process and transmitting such information to the drawing processor 112, the details of which will be described later.

The drawing processor 112 generates the image data such that the damage mark can be displayed on the display screen, utilizing the damage mark information transmitted through the damage mark processing and the image data read out from the RAM 111c. In the case where the damage mark information is not transmitted, the drawing processor 112 generates the image data for the display screen that does not include the damage mark.

Figure 9:
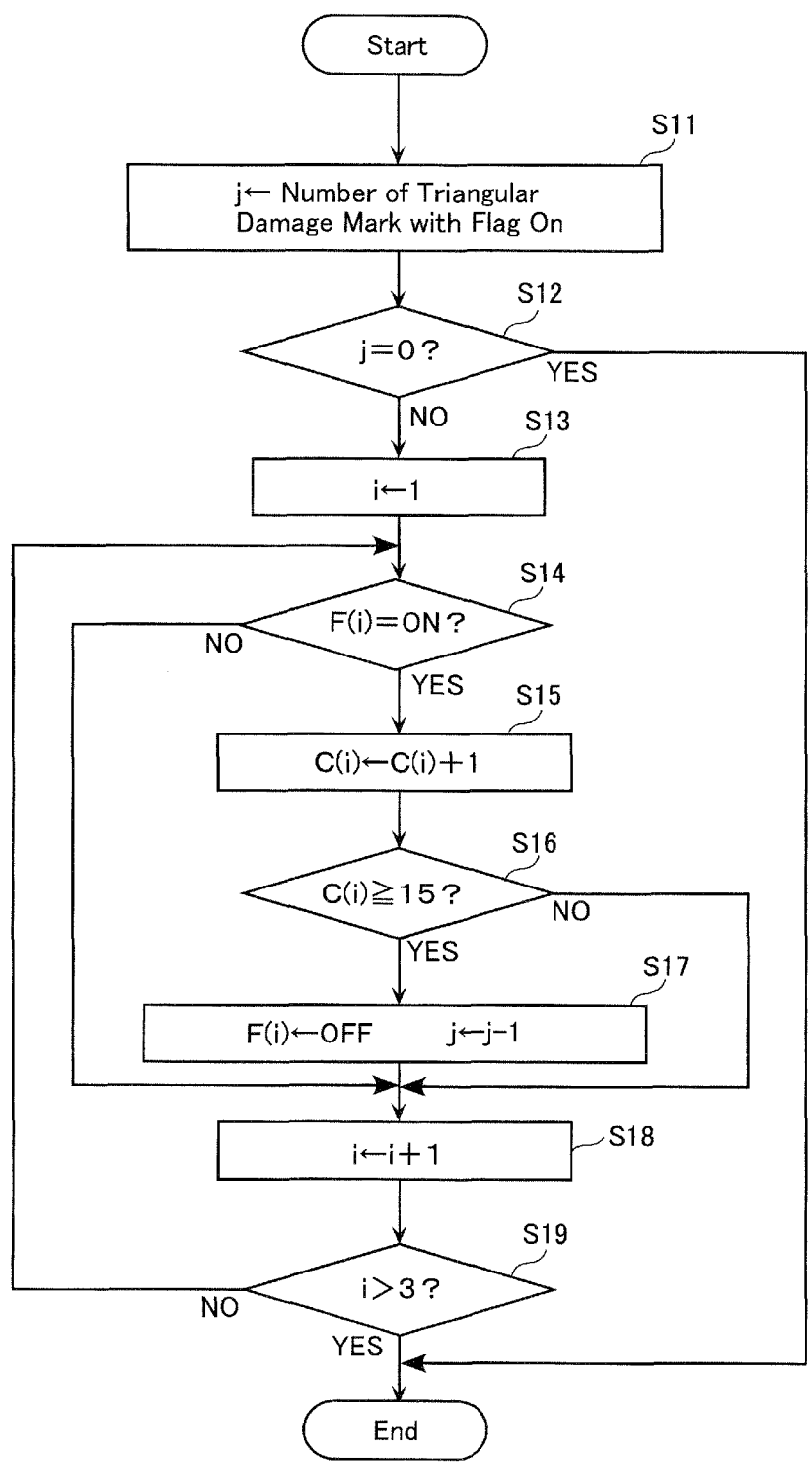
FIG. 9 is a flowchart showing a timing process of a triangular damage mark.

FIG. 9 is a flowchart showing steps of the triangular damage mark timing process. The triangular damage mark timing includes measuring the time after each of the triangular damage marks is displayed.

First, among the triangular damage marks DMT1 to DMT 3 in the damage mark table (Ref. FIG. 6), the number of those bearing the ON-state drawing flag is counted and input to a variable j (S11). In the case where, for example, the damage mark table is as shown in FIG. 6, 2 is input as j. In the case where the drawing flags of all the triangular damage marks are OFF, the steps S13 to S19 to be described later, as well as steps S42 to S46 shown in FIG. 12 to be described later are skipped, since there is no triangular damage mark displayed. The variable j is utilized for deciding whether those steps may be skipped.

Then it is decided whether the variable j is 0 (S12), and in the affirmative case (S12: YES) the triangular damage mark timing process is finished. This is because it is not necessary to measure the display period when there is no triangular damage mark (DMT1 to DMT 3) with the ON-state drawing flag, since in this case no triangular damage mark is displayed.

In the case where j is not 0 (S12: NO), in other words when at least one of the triangular damage marks bears the ON-state drawing flag, the display period of such triangular damage mark is measured (S13 to S19). Since the triangular damage mark timing process is executed every 1/30 second, counting the number of processes enables measuring the time. In this embodiment, the counter of the damage mark table is advanced by 1 for measuring the time. When the counter reaches 15, 0.5 seconds have elapsed, at which moment the drawing flag is turned OFF so that the triangular damage mark is no longer displayed.

Then at the step S13, 1 is input as a variable i. The variable i serves to designate one of the triangular damage marks DMT1 to DMT 3 on the damage mark table. It is then decided whether F(i) is ON (S14). F(i) is a variable that indicates the state of the drawing flag of the damage mark table, such that, for example, F(1) indicates the state of the drawing flag of DMT1. When the damage mark table is as shown in FIG. 6, F(1) is ON, F(2) is ON, and F(3) is OFF. In the case where F(i) is ON (S14: YES), C(i) is increased by 1 (S15). C(i) is a variable that indicates the state of the counter of the damage mark table, such that, for example, C(1) indicates the state of the counter for the DMT1. When the damage mark table is as shown in FIG. 6, C(1) is 12, C(2) is 5, and C(3) is 0.

It is then decided whether C(i) is not less than 15 (S16). In the affirmative case (S16: YES), F(i) is set as OFF, and the variable j is decreased by 1 (S17). In other words, once the counter exceeds 15 (0.5 seconds have elapsed after the mark is displayed), the corresponding drawing flag is turned OFF, so that the corresponding triangular damage mark is no longer displayed. Also, since the number of triangular damage marks bearing the ON-state drawing flag is decreased at this moment, the variable j is decreased by 1. In the case where C(i) is less than 15 (S16: NO), the process skips the step S17 and proceeds to the step S18. In other words, the corresponding drawing flag is maintained ON, so that the corresponding triangular damage mark continues to be displayed. In the case where F(i) is OFF at the step S14 (S14: NO), the process proceeds to the step S18 since the corresponding triangular damage mark is not displayed and hence it is not necessary to measure the display period.

Then the variable i is increased by 1 (S18), and it is decided whether the variable is greater than 3 (D19). In the negative case (S19: NO), the process returns to the step S14 and the timing process is executed with respect to the triangular damage mark corresponding to the variable i. In the affirmative case (S19: YES), the triangular damage mark timing process is finished because the timing process has been completed with respect to all of the triangular damage marks.

Figure 10:
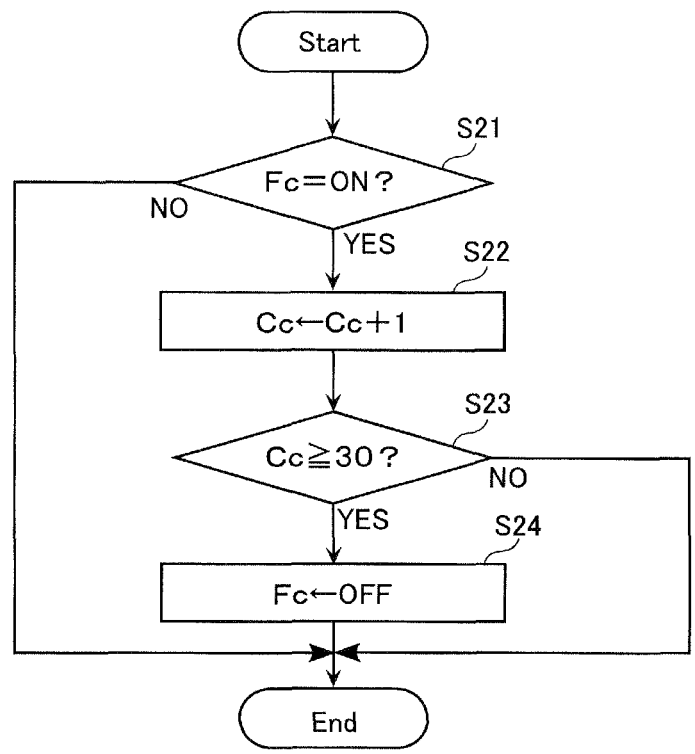
FIG. 10 is a flowchart showing timing process of an arcuate damage mark.

FIG. 10 is a flowchart showing steps of the arcuate damage mark timing process. The arcuate damage mark timing process includes measuring the period of time after the arcuate damage mark is displayed.

First, it is decided whether Fc is ON (S21). Fc is a variable that indicates the state of the drawing flag of the arcuate damage mark DMC in the damage mark table, and is ON when the damage mark table is as shown in FIG. 6. In the case where Fc is ON (S21: YES), Cc is increased by 1 (S22). Cc is a variable that indicates the state of the counter for the arcuate damage mark DMC in the damage mark table, and is 5 when the damage mark table is as shown in FIG. 6. The counter is increased by 1 for calculating the display period, only when the drawing flag of the arcuate damage mark DMC is ON.

Then it is decided whether Cc is not less than 30 (S23). In the affirmative case (S23: YES), Fc is turned OFF (S24) and the arcuate damage mark timing process is finished. In other words, when the counter exceeds 30 (one second or more has elapsed after the arcuate damage mark is displayed), the drawing flag of the arcuate damage mark DMC is turned OFF, so that the arcuate damage mark is no longer displayed. In the negative case (S23: NO), the step S24 is skipped and the arcuate damage mark timing process is finished. In other words, the drawing flag of the arcuate damage mark DMC is maintained ON, so that the arcuate damage mark remains displayed. In the case where Fc is OFF at the step S21 (S21: NO), the arcuate damage mark timing process is finished since the arcuate damage mark is not displayed and hence it is not necessary to measure the display period.

According to the flowcharts shown in FIGS. 9 and 10, the counter of the damage mark table is increased in an increment of 1 to thereby measure the time, utilizing the setting that the damage mark processing is executed every 1/30 second. Here, the interval at which the damage mark processing is executed (interval at which the drawing process is executed) may vary instead of being fixed. Under such setting, the counting increment may be adjusted according to the interval. For example, in the case where the damage mark processing is executed every 1/60 second, the count may be increased in an increment of 0.5, and in the case where the damage mark processing is executed every 1/15 second, the count may be increased in an increment of 2. Alternatively, the actual lapse of time may be measured instead of counting the processings. In this case, the CPU 111a may be set to measure the time and to add the elapsed time after the preceding damage mark processing.

Figure 11:
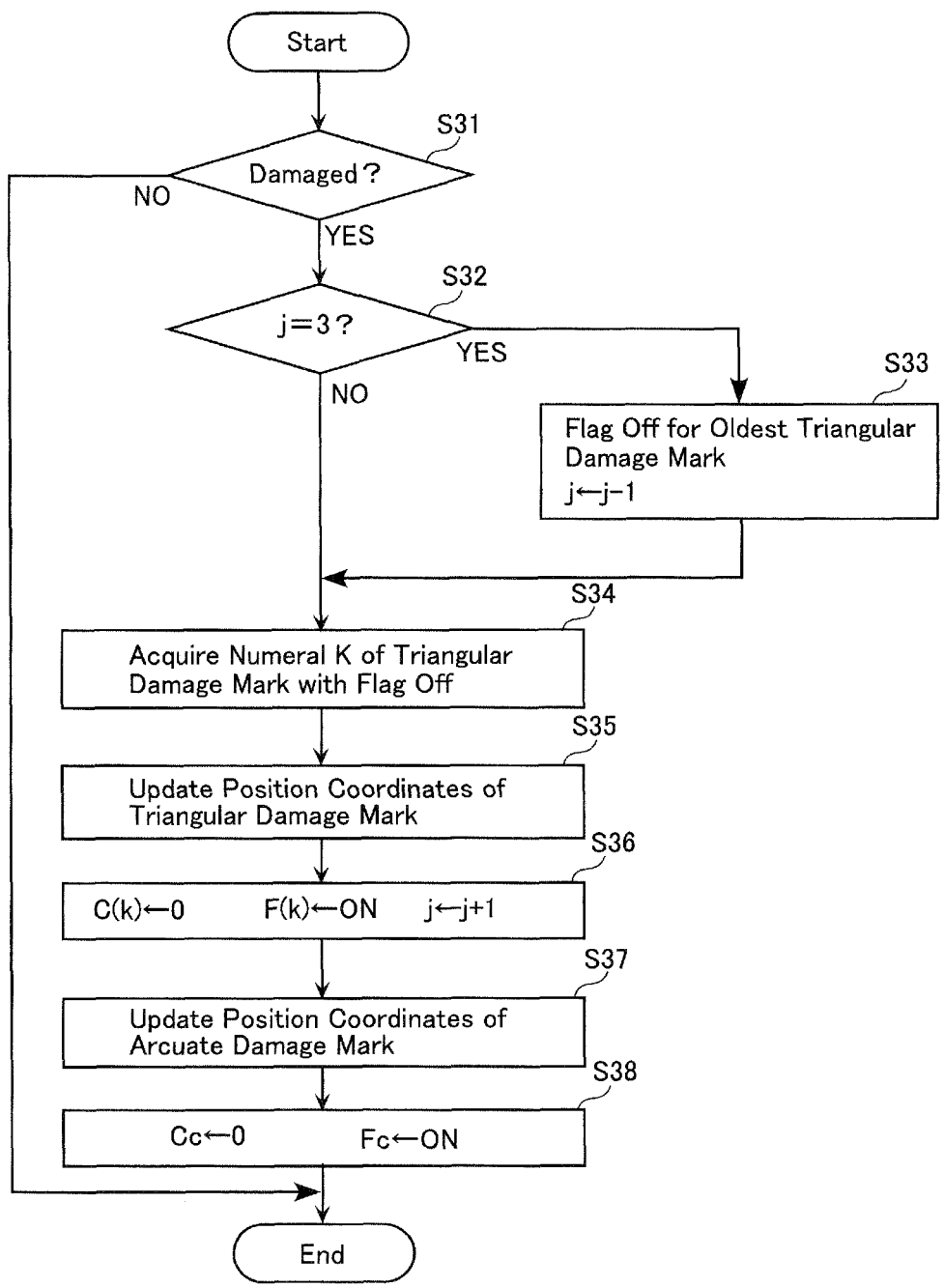
FIG. 11 is a flowchart showing an updating process of the damage mark table.

FIG. 11 is a flowchart showing steps of the damage mark table update process. The damage mark table update process includes deciding whether the player character has received an attack (suffered a damage), to thereby update the damage mark table (Ref FIG. 6) in the affirmative case.

First, it is decided whether the player character has suffered a damage, i.e. has received an attack from the enemy character (S31). Such decision is made according to a result of a damage decision process (deciding whether the player character has received the attack from the enemy characters through comparison of the coordinate of the bullets fired by the respective enemy characters and that on the polygon constituting the player character). Also, through the damage decision process, in the case where the coordinate of the bullet fired by the enemy character and that on the polygon constituting the player character coincide, the coordinate of that bullet is acquired as the impact point coordinate, and the coordinate of the point of the machine gun at the moment that the bullet has been fired is acquired as the firing point coordinate. Here, the result of the damage decision process is also reflected to a decrease in Hit Point HP (Ref FIG. 1). In the case where the player character has suffered a damage (S31: YES), the firing point coordinate of the arcuate damage mark and at least one of the triangular damage marks in the damage mark table are overwritten (S34 to S38).

In the case where the variable j is 3, i.e. the drawing flags of all the triangular damage marks are ON (S32: YES), the drawing flag of the oldest triangular damage mark (having a greatest counter value) is turned OFF, and the variable j is decreased by 1 (S33). Since three triangular damage marks are utilized in this embodiment, in the case where the three triangular damage marks are already displayed, an oldest triangular damage mark is erased so that a new one can be displayed. Also, since the number of triangular damage marks bearing the ON-state drawing flag is decreased at this moment, the variable j is decreased by 1.

Then a numeral k designating one of the triangular damage marks bearing the OFF-state drawing flag is acquired (S34). Through the steps S32 and S33, the drawing flag of at least one of the triangular damage marks is turned OFF. Under the state according to the damage mark table shown in FIG. 6 the drawing flag of DMT 3 is OFF, and hence 3 is acquired as k. In the case where two or more triangular damage marks bear the OFF-state drawing flag, the smaller number is acquired. For example, DMT1 and DMT 3 bear the OFF-state drawing flag, 1 is acquired as k. Here, the greater number may be acquired, or either number may be optionally acquired.

Then the firing point coordinate and the impact point coordinate of the triangular damage mark corresponding to the numeral k in the damage mark table are overwritten into the coordinate acquired through the damage decision process (S35), and the counter C(k) is initialized to 0 and the drawing flag F(k) is turned ON (S36). Since the number of triangular damage marks bearing the ON-state drawing flag is increased at this moment, the variable j is increased by 1.

The firing point coordinate and the impact point coordinate of the arcuate damage mark in the damage mark table are overwritten into the coordinate acquired through the damage decision process (S37); the counter Cc is initialized to 0; the drawing flag Fc is turned ON (S38); and the damage mark table update process is finished.

In the case where the player character has not suffered a damage at the step S31 (S31: NO), the damage mark table is not updated and the damage mark table update process is finished.

Figure 12:
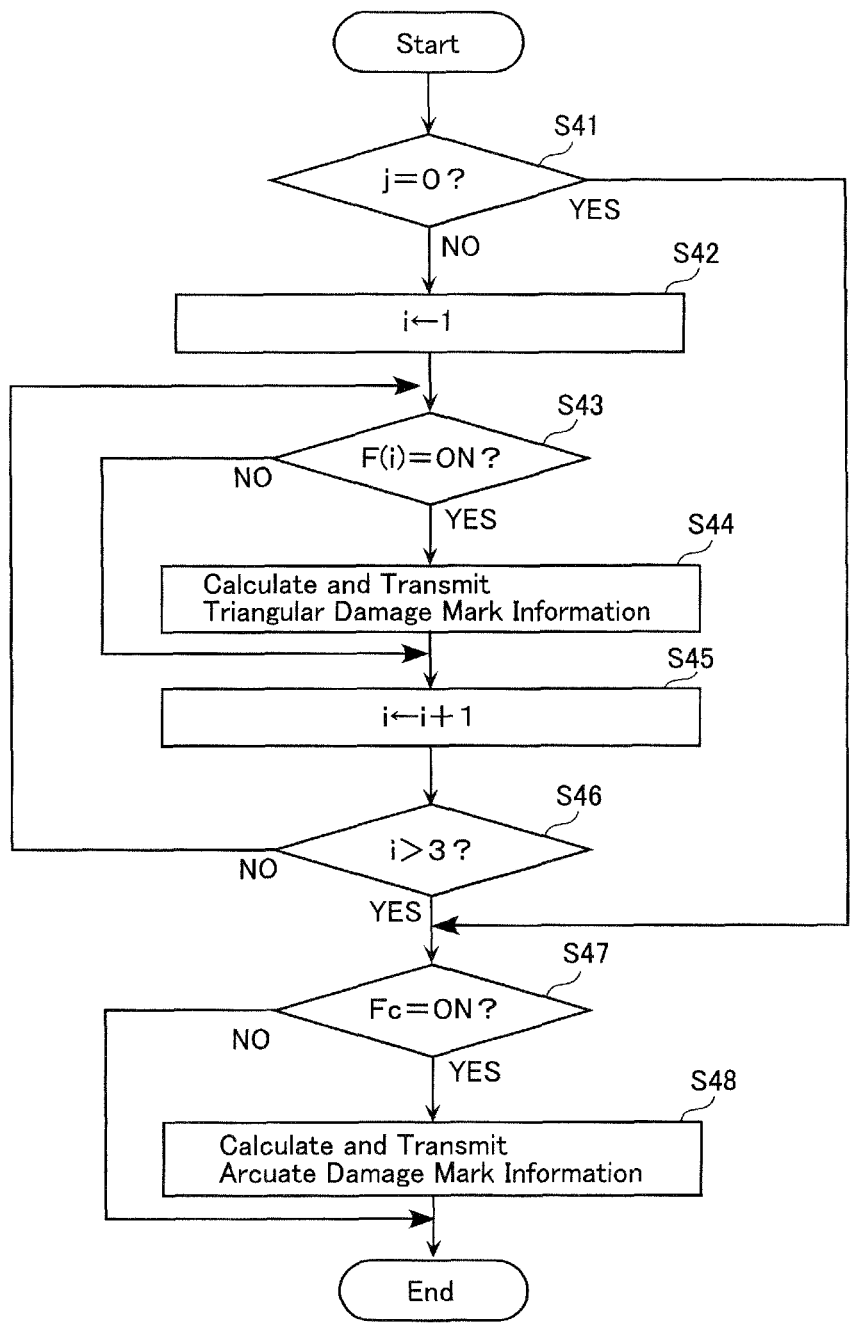
FIG. 12 is a flowchart showing a transmission process of damage mark information.
Figure 13:
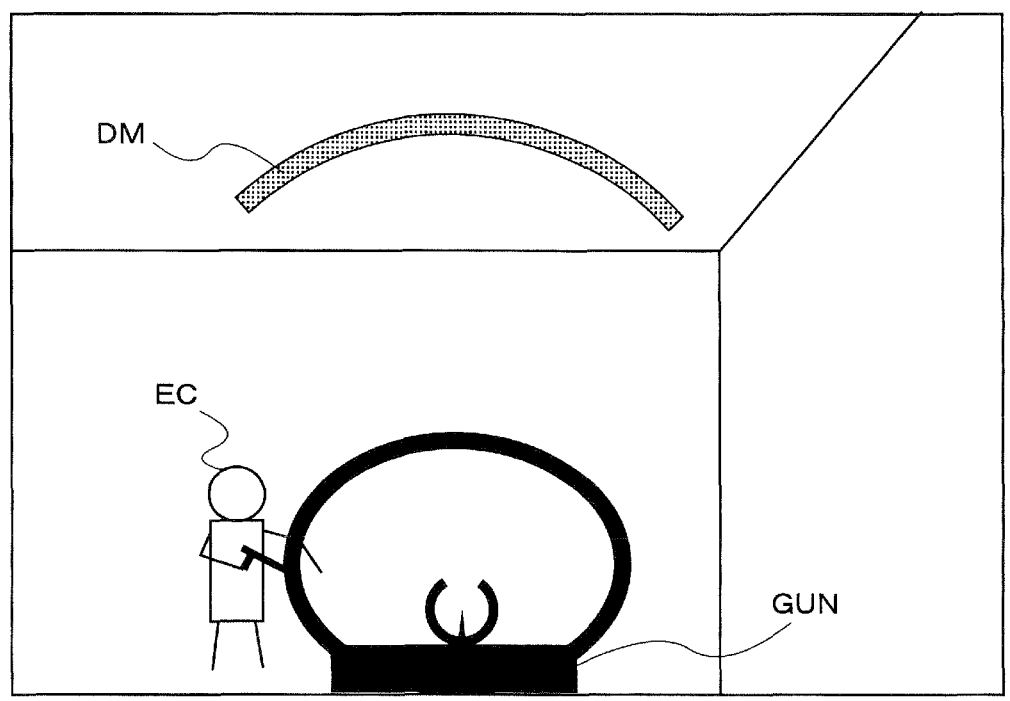
FIG. 13 is a schematic drawing for explaining a conventional shooting game.

FIG. 12 is a flowchart showing steps of the damage mark information transmission process. The damage mark information transmission process includes calculating the damage mark information necessary for the drawing process, and transmitting such information to the drawing processor 112.

First, it is decided whether the variable j is 0 (S41), and in the affirmative case (S41: YES), the process proceeds to the step S47. This is because in the case where none of the triangular damage marks (DMT1 to DMT 3) bears the ON-state drawing flag, it is not necessary to transmit the damage mark information since there is no triangular damage mark to be displayed.

In the negative case (S41: NO), in other words in the case where at least one of the triangular damage marks bears the ON-state drawing flag, the damage mark information of that triangular damage mark bearing the ON-state drawing flag is calculated and transmitted (S42 to 46).

Then 1 is input as the variable i at the step S42, and it is decided whether F(i) is ON (S43). In the affirmative case (S43: YES), the damage mark information of the corresponding triangular damage mark is calculated and transmitted to the drawing processor 112 (S44). The damage mark information specifically includes the angles $\theta d$ and $\theta y$ necessary for drawing the damage mark, which are calculated through the equations (2) and (4) based on the firing point coordinate and the impact point coordinate recorded in the damage mark table.

Instead of calculating the angles $\theta d$ and $\theta y$ in the CPU 111a, the firing point coordinate and the impact point coordinate may be transmitted to the drawing processor 112 as the damage mark information, so that the drawing processor 112 may calculate the angles $\theta d$ and $\theta y$. Also, the vector directed to the firing point coordinate from the impact point coordinate may be calculated, and such vector may be recorded in the damage mark table in place of the firing point coordinate and the impact point coordinate. Alternatively, the angles $\theta d$ and $\theta y$ may be first calculated based on the firing point coordinate and the impact point coordinate, and then recorded in the damage mark table in place of the firing point coordinate and the impact point coordinate. In these cases, the transmission can be executed without calculating the damage mark information, at the step S44.

In the case where F(i) is OFF at the step S43 (S43: NO), the process skips the step S44 and proceeds to the step S45, because the corresponding triangular damage mark is not displayed. Then the variable i is increased by 1 (S45), and it is decided whether the variable i has exceeded 3 (S46). In the negative case (S46: NO), the process returns to the step S43. In the affirmative case (S46: YES), the process proceeds to the step S47.

Then it is decided whether Fc is ON (S47). In the affirmative case (S47: YES), the damage mark information of the arcuate damage mark is calculated and transmitted to the drawing processor 112 (S48). The angles θd and θy which are the damage mark information can be calculated through the equations (2) and (4) based on the firing point coordinate and the impact point coordinate recorded in the damage mark table.

The firing point coordinate and the impact point coordinate of the arcuate damage mark coincide with those of the latest triangular damage mark (DMT2 in FIG. 6), and hence the damage mark information may be calculated based on the firing point coordinate and the impact point coordinate of the triangular damage mark and transmitted, and alternatively the damage mark information calculated at the step S44 may be transmitted. Otherwise, the firing point coordinate and the impact point coordinate may be transmitted to the drawing processor 112 as the damage mark information, so that the drawing processor 112 may calculate the angles θd and θy, or the vector directed to the firing point coordinate from the impact point coordinate may be recorded in the damage mark table. Alternatively, the angles θd and θy may be calculated in advance and recorded in the damage mark table.

In the case where Fc is OFF at the step S47 (S47: NO), the arcuate damage mark is not displayed, and hence the step S48 is skipped and the damage mark information transmission process is finished.

According to this embodiment, when the player character is attacked the damage marks are located and displayed at a position corresponding to the attack direction on the region set around the player character, based on the firing point coordinate of the bullet fired by the enemy character and the impact point coordinate on the player character. Since the damage marks are thus displayed around the player character, the attack direction indicated by the damage marks and the actual attack direction in the virtual space can be displayed in correlation with each other, so that the player can readily recognize from which direction the enemy character has made the attack. Also, the damage marks are displayed on the display screen by projection like other objects in the 3D virtual game space, and therefore the back and forth direction (depthwise direction) of the virtual game space can be expressed. Such arrangement further facilitates the player to readily recognize from which direction the enemy character has made the attack. Further, since the display of the damage mark also reflects the height component of the attack direction from the enemy character, the player can readily recognize whether the enemy character that has made the attack is located at a higher position or a lower position.

This embodiment employs the conical triangular damage marks and the arcuate damage mark, so that the triangular damage marks indicate a precise direction of the attack, and that even when the triangular damage marks are hidden behind the player character and difficult to be seen, the large arcuate damage mark can roughly indicate the attack direction. Also, the number of the triangular damage marks is limited to three, and just a single arcuate damage mark is employed, and further the display period is set at 0.5 seconds and 1 second respectively. Such arrangement prevents such a situation that too many damage marks are displayed at a time and the display screen becomes too much complicated to watch.

Although the foregoing embodiment exemplifies the case where the damage marks are displayed based on the firing point coordinate of the bullet fired by the enemy character and the impact point coordinate on the player character, the present invention is applicable to a different situation. For example, in the case where the enemy character utilizes arrows or stones for the attack, the coordinate of the position where the arrow has been emitted or the stone has been thrown (corresponding to the attack firing point according to the present invention) may be employed in place of the firing point information, and the coordinate of the position where the arrow or the stone has hit the player character (corresponding to the attack impact point according to the present invention) may be employed in place of the impact point coordinate. Also, a different position coordinate of the enemy character may be employed instead of the coordinate of the position where the attack from the enemy character is originated, such as the firing point coordinate, and a different position coordinate of the player character may be employed instead of the position where the player character receives the attack, such as the impact point coordinate. More specifically, the coordinate of a desired position (reference point) on the enemy character may be employed instead of the firing point coordinate, and the coordinate of a desired position (reference point) on the player character may be employed instead of the impact point coordinate.

Also, although the embodiment exemplifies the case where the damage marks are located in reference to the player character position coordinate, the damage marks may be otherwise located. The reference point for locating the damage marks may be set on the impact point coordinate, or on a desired point on the player character. Here, in order to express the attack direction toward the player character, a point on the player character (including the inside and vicinity of the player character) has to be utilized as the reference. Also, the central point for defining the locating region of the damage mark may be set on a plurality of positions, without limitation to just one. For example, other than the player character position coordinate, the locating region of the damage mark may be set about a point on the head and the leg of the player character, so that the location of the damage mark may be switched between those locating regions according to the angle θy (Ref. FIG. 5). For example, the damage mark may be located on the locating region about the point on the head when the angle θy is not smaller than 15°, or located on the locating region about the point on the leg when the angle θy is not greater than −15°, or located on the locating region about the player character position coordinate when the angle θy greater than −15° but smaller than 15°. Also, the triangular damage mark displayed in such cases may be displayed with an inclination according to the angle θy.

Also, the location of the damage mark may be switched between the foregoing locating regions according to the impact point on the player character. For example, in the case where the impact point is on the upper body of the player character the damage mark may be located about the player character position coordinate (located on the locating region formed about the player character position coordinate), and in the case where the impact point is on the head of the player character the damage mark may be located about the central point of the head (located on the locating region formed about the head). Alternatively, different reference points may be given according to the type of the damage mark.

Further, although the embodiment exemplifies the case where the image data of the damage marks is prepared in advance to be located about the player character position coordinate, and the damage marks are rotationally located by an angle determined according to the attack direction about the player character position coordinate, the damage marks may be otherwise located. The reference point may be determined based on a circle, a circular column, or a sphere formed about the player character position coordinate and based on the attack direction, to thereby locate the damage mark about such reference point. For example, the reference point may be set on an intersection of a sphere of a predetermined radius about the player character position coordinate and a line connecting the firing point coordinate and the impact point coordinate, to thereby locate the damage mark about such reference point. Also, the damage marks may be located in different manners according to the type thereof.

Further, although the embodiment employs the conical triangular damage marks and the arcuate damage mark, the damage marks may be provided in a different manner. The number of types of the damage marks to be utilized, the number of damage marks to be displayed and the display period thereof may be determined as desired. Also, the shape, size, and color of the damage marks to be displayed are not specifically limited, but may vary according to the state. For example, the damage mark may be set to be normally yellow, and to turn red in the case where the Hit Point HP (Ref FIG. 1) of the player drops below a predetermined level (for instance, 20%). Such change in color permits the player to recognize that the player character is in a dangerous situation. Also, the shape, size, and color of the damage marks may vary according to the distance from the enemy character. For example, the length (height of the cone) of the triangular damage marks or the size of the arcuate damage mark (length of the arc) may be increased according to the distance from the enemy character. Such difference in size enables the player to recognize the distance from the enemy character.

Although the damage decision process is executed based on the coordinate of the bullet and that on the polygon constituting the player character in the foregoing embodiment, the damage decision process may be otherwise executed. The damage decision process may be executed through decision of collision of a solid enclosing therein the player character (or formed inside the player character) and the bullet. Examples of the shape of the solid include a sphere, an ellipsoid, a parallelepiped, and combinations thereof. The solid may be of any such shape, however it is preferable that the shape of the solid generally fits the shape of the player character.

Although the embodiment exemplifies the case where the game is played on a home-use game machine, a game machine of a different type may be employed. The present invention is widely applicable to game machines such as a portable game machine, an arcade game machine, a personal computer in which a game software is installed, and so forth.

Although the embodiment exemplifies the case where the game machine 1 is used by a single person, the present invention is applicable to a different situation. For example, a plurality of game machines 1 may be connected through a cable or wireless communication, and the game machine 1 may be connected to a game server through the internet line 2, to thereby simultaneously play the same game with the plurality of game machines 1.

Although the embodiment takes up the shooting game as the example, the present invention is applicable to a game of a different type. Since the feature of the present invention lies in facilitating the player to readily recognize from which direction the enemy character not displayed on the monitor screen is making the attack, the present invention is suitably applicable to such a game in which the enemy character makes the attack from a distant location. For example, the present invention is applicable to a role-playing game in which real-time shooting is made, and to a fighting game in which a plurality of enemy characters utilize a projectile weapon for the attack. The present invention is also applicable to a game in which the player character attempts to escape dodging unilateral attacks from the enemy character, without attacking the enemy character.

Further, the present invention is applicable to such games in which characters operated by a plurality of players or controlled by the CPU organize a team and collaborate in the fight with the enemy characters, and in which the fight is waged against the enemy character operated by another player. The enemy character does not necessarily have to be an object that simulates a personality, but may be a movable weapon such as a robot, a fighter, a tank, or a cannon.

The game machine according to the present invention is not limited to the foregoing embodiment. Specific structure of each part of the game machine according to the present invention may be designed in various different manners.

The invention claimed is:

1. A computer readable non-transitory storage medium storing a program to cause a computer to be used as a game machine that activates a player character operated by a human player and an enemy character that attacks the player character in a three dimensional virtual game space, the program causing the computer to operate as:
 a player position information acquisition unit that acquires player position information indicating a position of the player character in the virtual game space;
 an enemy position information acquisition unit that acquires enemy position information indicating a position of the enemy character in the virtual game space;
 an attack direction acquisition unit that acquires a direction of an attack received by the player character from the enemy character based on the player position information and the enemy position information;
 a damage mark generation unit that generates, when the player character is attacked by the enemy character, a damage mark at a position corresponding to the attack direction in a predetermined player region set around the player character, the damage mark being an object including a first portion and a second portion, the first portion having a shape indicating the attack direction, the second portion having a shape indicating the attack direction, wherein the damage mark generation unit locates a center of the indicating portion of the second portion so as to overlap the indicating portion of the first portion; and
 a display controller that displays at least part of the three dimensional virtual game space including the player character and the damage mark,
 wherein the shape of the second portion is an arc that is part of a circle about a reference point of the player character, the arc protruding toward the attack direction.

2. The computer readable non-transitory storage medium according to claim 1, wherein the damage mark generation unit retains the generated first portion for a first predetermined period of time and retains the generated second portion for a second predetermined period of time.

3. The computer readable non-transitory storage medium according to claim 1, wherein the damage mark generation unit prevents no less than a first predetermined number of the first portions from being located in the three dimensional virtual game space and prevents no less than a second predetermined number of the second portions from being located in the three dimensional virtual game space.

4. The computer readable non-transitory storage medium according to claim 1,
 wherein each of the first portion and the second portion has a shape including an indicating portion which is a portion indicating the attack direction.

5. The computer readable non-transitory storage medium according to claim 1, wherein the first portion is of a conical shape, and a heightwise direction of the cone indicates the attack direction, and an apex of the cone is directed to the player character.

6. The computer readable non-transitory storage medium according to claim 1, wherein the damage mark generation unit changes an attribute of the damage mark according to a distance between the player character and the enemy character that performs an attack.

7. The computer readable non-transitory storage medium according to claim 1, wherein the predetermined player region is provided in a spherical shape about a reference point of the player character.

8. A game system for activating a player character operated by a human player and an enemy character that attacks the player character in a three dimensional virtual game space, comprising:
 a player position information acquisition unit that acquires player position information indicating a position of the player character in the virtual game space;
 an enemy position information acquisition unit that acquires enemy position information indicating a position of the enemy character in the virtual game space;
 an attack direction acquisition unit that acquires a direction of an attack received by the player character from the enemy character based on the player position information and the enemy position information;
 a damage mark generation unit that generates, when the player character is attacked by the enemy character, a damage mark at a position corresponding to the attack direction in a predetermined player region set around the player character, the damage mark being an object including a first portion and a second portion, the first portion having a shape indicating the attack direction, the second portion having a shape indicating the attack direction, wherein the damage mark generation unit locates a center of the indicating portion of the second portion so as to overlap the indicating portion of the first portion; and
 a display controller that displays at least part of the three dimensional virtual game space including the player character and the damage mark,
 wherein the shape of the second portion is an arc that is part of a circle about a reference point of the player character, the arc protruding toward the attack direction.

9. The game system according to claim 8, wherein the damage mark generation unit retains the generated first portion for a first predetermined period of time and retains the generated second portion for a second predetermined period of time.

10. The game system according to claim 8, wherein the damage mark generation unit prevents no less than a first predetermined number of the first portions from being located in the three dimensional virtual game space and prevents no less than a second predetermined number of the second portions from being located in the three dimensional virtual game space.

11. The game system according to claim 8,
 wherein each of the first portion and the second portion has a shape including an indicating portion which is a portion indicating the attack direction.

12. The game system according to claim 8, wherein the first portion is of a conical shape, and a heightwise direction of the cone indicates the attack direction, and an apex of the cone is directed to the player character.

13. The game system according to claim 8, wherein the damage mark generation unit changes an attribute of the damage mark according to a distance between the player character and the enemy character that performs an attack.

14. A method for controlling, by a computer having one or more processors, a game that activates a player character operated by a human player and an enemy character that attacks the player character in a three dimensional virtual game space, the method comprising:
 the one or more processors of the computer performing:
 a first step of acquiring player position information indicating a position of the player character in the virtual game space;
 a second step of acquiring enemy position information indicating a position of the enemy character in the virtual game space;
 a third step of acquiring a direction of an attack received by the player character from the enemy character based on the player position information and the enemy position information;
 a fourth step of generating, when the player character is attacked by the enemy character, a damage mark at a position corresponding to the attack direction in a predetermined player region set around the player character, the damage mark being an object including a first portion and a second portion, the first portion having a shape indicating the attack direction, the second portion having a shape indicating the attack direction, wherein the fourth step locates a center of the indicating portion of the second portion so as to overlap the indicating portion of the first portion; and
 the fifth step of displaying at least part of the three dimensional virtual game space including the player character and the damage mark,
 wherein the shape of the second portion is an arc that is part of a circle about a reference point of the player character, the arc protruding toward the attack direction.

15. The method for controlling the game according to claim 14, wherein the fourth step retains the generated first portion for a first predetermined period of time and retains the generated second portion for a second predetermined period of time.

16. The method for controlling the game according to claim 14, wherein the fourth step prevents no less than a first predetermined number of the first portions from being located in the three dimensional virtual game space and prevents no less than a second predetermined number of the second portions from being located in the three dimensional virtual game space.

17. The method for controlling the game according to claim 14,
 wherein each of the first portion and the second portion has a shape including an indicating portion which is a portion indicating the attack direction.

18. The method for controlling the game according to claim 14, wherein the first portion is of a conical shape, and a heightwise direction of the cone indicates the attack direction, and an apex of the cone is directed to the player character.

19. The method for controlling the game according to claims 14, wherein the fourth step changes an attribute of the damage mark according to a distance between the player character and the enemy character that performs an attack.

20. The method for controlling the game according to claim 14, wherein the predetermined player region is provided in a spherical shape about a reference point of the player character.

* * * * *